United States Patent [19]
Oda

[11] Patent Number: 6,076,818
[45] Date of Patent: Jun. 20, 2000

[54] SHEET SENSING DEVICE FOR A COPYING APPARATUS

[75] Inventor: Ayumu Oda, Yamatokoriyama, Japan

[73] Assignee: Sharp Kabushiki Kaisha, Osaka, Japan

[21] Appl. No.: 08/890,551

[22] Filed: Jul. 9, 1997

[30] Foreign Application Priority Data

Jul. 25, 1996 [JP] Japan ................................. P8-196452

[51] Int. Cl.$^7$ .................................................. B65H 85/00
[52] U.S. Cl. .................. 271/3.04; 271/3.08; 271/265.01
[58] Field of Search ................... 271/3.04, 3.08, 271/3.07, 3.15, 265.01

[56] References Cited

U.S. PATENT DOCUMENTS

| | | | |
|---|---|---|---|
| 4,469,320 | 9/1984 | Wenthe, Jr. ......................... | 271/3.04 X |
| 4,861,012 | 8/1989 | Shimizu .............................. | 271/3.08 X |
| 4,893,804 | 1/1990 | Sasage et al. ......................... | 271/3.09 |
| 5,022,641 | 6/1991 | Okada ................................... | 271/3.08 |
| 5,076,559 | 12/1991 | Lawniczak ............................. | 271/3.1 |
| 5,088,714 | 2/1992 | Nagasawa et al. ..................... | 271/3.08 |
| 5,169,135 | 12/1992 | Hamanaka et al. . | |
| 5,409,203 | 4/1995 | Okamoto et al. . | |
| 5,716,046 | 2/1998 | Katamoto et al. ..................... | 271/3.08 |

FOREIGN PATENT DOCUMENTS

| | | |
|---|---|---|
| 60-244721 | 12/1985 | Japan . |
| 61-090930 | 5/1986 | Japan . |
| 1-209233 | 8/1989 | Japan . |
| 401256429 | 12/1989 | Japan . |
| 2-265874 | 10/1990 | Japan . |
| 4-328586 | 11/1992 | Japan . |
| 52-65269 | 10/1993 | Japan . |

OTHER PUBLICATIONS

Swanson, Roger, Set Separator Linkage, Xerox Disclosure Journal, vol. 4, No. 5, p. 671, 1979.

*Primary Examiner*—Christopher P. Ellis
*Assistant Examiner*—Patrick Mackey

[57] ABSTRACT

A miniaturized and inexpensive sheet sensing device which is easy to control and simple in construction and makes it possible to reliably sense one circulation of the sheet. A sensing member whose tip end is reciprocatingly displaceable in the direction of stacking of documents is disposed from the top face side to the bottom face side of the documents. At this time, the sensing member is bent and the tip end thereof passes along the side face of the document. In this way, at an initial stage of the conveyance of the document, the sensing member is disposed on the bottom face side of the stack of documents and at this time the sensing member becomes substantially linear, whereby the tip end thereof abuts on the bottom face of the stack of documents. In such a state, the conveying operation is repeated. A sensor senses that the sensing member has passed through the top face side and thereby senses that the conveying operation of the document has made its one circulation. The movement range of the sensing member becomes narrowed with the result that the one-circulation sensing unit can be miniaturized.

15 Claims, 14 Drawing Sheets

SHEET SENSING DEVICE FOR A COPYING APPARATUS

BACKGROUND OF THE INVENTION

1. Field of the Invention

The present invention relates to a sheet sensing device which is used being loaded on, for example, a circulation type automatic document feeding apparatus (hereinafter referred to as "RDH") and which is used to sense that a sheet has made its one circulation.

2. Description of the Related Art

The RDH is used being loaded on, for example, a main body of a copying apparatus and the copying apparatus which is constructed including the RDH and the main body of the copying apparatus reads the image of a sheet-like document that is conveyed by the RDH and copies this image onto a prescribed sheet of recording paper. A reading portion for reading an image is set on the main body of the copying apparatus. Light is radiated onto the document that has reached the reading portion. The reflected light is imaged on a photosensitive body uniformly charged to a prescribed potential, forms an electrostatic latent image that corresponds to the image, develops this electrostatic latent image into a toner image, transfers this toner image onto a transfer sheet of paper, heats and fixes this transfer sheet of paper, and then discharges the resulting transfer sheet of paper.

In the RDH that includes a one-circulation sensing unit, the documents stacked are successively conveyed from above one by one and carried into a prescribed conveying path. The document has its image read at the reading portion of the main body of the copying apparatus and is returned to the bottom face of the stacked documents. This conveying operation is repeated whereby when the conveying operation is performed the one-circulation sensing unit senses whether or not the conveyance of the document has made its one circulation.

FIG. 16 is a side view illustrating the construction of a prior art one circulation sensing unit and FIG. 17 is a view illustrating a movable range 84 of a sensing member 85 of the one circulation sensing unit. To the bar-shaped sensing member 85 there is applied a power that is sent from a stepping motor 88 through a belt 89, whereby the sensing member 85 makes its rotary movement about a base end portion 85b thereof through the interior of a circular range whose radius is the length of the sensing member 85. A retracted position is set above the documents X stacked on a document tray 91 and a sensor 87 is disposed at this retracted position. Below the stacked documents X there is set a home position which is different from the retracted position and at which a sensor 90 is disposed. Also, the sensing member 85 is always urged toward the top face of the stack of documents X.

First, the sensing member 85 is disposed at its retracted position (S31). By driving the stepping motor 88 and thereby swinging the sensing member 85, this sensing member 85 is disposed at its home position (S32). That the sensing member 85 is disposed at its home position is sensed by the sensor 90. Further, the stepping motor 88 is driven and the sensing member 85 is thereby swung and is thereby caused to abut on the bottom face X2 of the stack of documents (S33), whereby the conveying operation of the documents is started. When the sensing member 85 is further swung whereby the sensing member 85 passes through the top face X1 of the stacked documents, the sensing member 85 is again disposed at its retracted position by the spring 86 (S31). That the sensing member 85 is disposed at its retracted position is sensed by the sensor 87.

The sensing member 85 makes its rotary movement about the base end portion 85b within the range of a circle whose radius is the length of the sensing member 85. Accordingly, the movement range of the sensing member 85 is relatively wide, with the result that the one-circulation sensing unit and hence the RDH becomes further enlarged in size.

Also, since the retracted position is set above the stacked documents X and the sensor 87 is disposed there and the home position that is different from the retracted position therebelow is set and the sensor 90 is disposed there, the number of the sensors is relatively large and the construction becomes complex.

Furthermore, since use is made of the stepping motor 88, the control thereof is relatively complex. Also, the manufacturing cost is relatively expensive.

Also, referring to FIG. 17, when the angle $\theta 2$ that is defined between a top face X1$a$, X1$b$ of the stack of documents X that is located over the sensing member 85 and the locality thereon of the sensing member 85 is relatively large, in the mid-course of the conveying operation the sensing member 85 does not reliably abut on a face of the documents X, with the result that the sensing member 85 kicks up the documents X despite the documents X being still existent on the sensing member 85, with the result that the one circulation of the document conveyance is erroneously detected. In a case where conveying a large number of documents or conveying the documents each having a relatively large thickness, there increases the likelihood of such erroneous detection being made.

Although in order to prevent the occurrence of the above-mentioned inconvenience by making the angle $\theta 2$ small it is considered to make large the length of the sensing member 85, there arises the inconvenience of the one-circulation sensing unit being further enlarged in size.

A prior art disclosed in Japanese Unexamined Patent Publication JP-A 61-90930 (1986) relates to a document circulation apparatus which detects a failure of setting a document using a divider arm for sensing one circulation of document to control conveying documents. Specifically, the divider arm of the document circulation apparatus can make one turn about a prescribed axis, and after the divider arm is set on an uppermost document with a predetermined lever pin, the divider arm is fallen by its dead weight on conveyance of the documents.

A prior art disclosed in Japanese Unexamined Patent Publication JP-A 2-265874 (1990) relates to a circulation type document conveyance apparatus using a divider arm member for sensing a document circulation, specifically, in which the divider arm can turn horizontally and helically, and ascending and descending movements are conducted by a predetermined driving force and free fall, respectively.

Further, the prior art disclosed in Japanese Unexamined Patent Publication JP-A 5-265269 (1993) relates to a copying apparatus comprising sensing means for sensing one document circulation. A sensing actuator which is disposed at a position of the lowermost one of set documents ascends as the documents are conveyed, and when being positioned at a position of the uppermost document, the sensing actuator senses one document circulation. Such copying machine is disclosed in Japanese Unexamined Patent Publication JP-A 1-209233 (1989), too.

However, moving ranges of the divider arm disclosed in JP-A 61-90930, the divider arm member disclosed in JP-A 2-265874, and the sensing actuator disclosed in JP-A 5-265269 and JP-A 1-209233 are relatively wide the same as in an embodiment shown in FIG. 16, resulting in upsizing of the apparatuses.

SUMMARY OF THE INVENTION

An object of the present invention is to provide a miniaturized and inexpensive sheet sensing device which is easy to control and simple in construction and enables reliable detection of one circulation of a sheet.

The present invention provides a sheet sensing device for repeating a conveying operation of introducing stacked sheets one by one from a one-face side of the stack of sheets into a prescribed conveying path and returning the introduced sheet from the conveying path to a side of a face of the stack counter to the one-face of the stack to sense whether or not the sheet conveying operation has made a one circulation, the sheet sensing device comprising:

a sensing member having a tip end which can be reciprocatingly moved in a direction of stacking of sheets and be bent to pass along a side face of the stack of sheets when being displaced from the one-face side to the counter-face, the sensing member wherein a plurality of bar-shaped members are connected so that the sensing member becomes substantially linear and the tip end can abut on a face of the stack of sheets when the sensing member is displaced from the one-face side to the counter-face of the stack of sheets; and sensing means for disposing the sensing member on the counter-face side of the stack of sheets at an early stage to detect that the sensing member has passed through the one-face side, and thereby sensing that the conveying operation of the sheets has made its one circulation.

According to the present invention, the sensing member whose tip end can be reciprocatingly displaced in the direction of stacking of the sheet is displaced from the one-face side of the stack of sheets to the counter-face side thereof. At this time, the sensing member is bent and the tip end thereof passes along the side face of the stack of sheets. In this way, at the initial stage of conveyance of the sheets, the sensing member is disposed on the counter-face side of the stack of sheets and, at this time, the sensing member becomes substantially linear whereby the tip end thereof abuts on a face of the stack of sheets. The conveying operation is repeated in such a way. The sensing means detects that the sensing member has passed through the one-face side to thereby sense that the conveying operation of the sheets has made its one circulation.

In contrast to the prior art wherein the sensing member makes its rotary movement over a range of a circle whose radius is the length of the sensing member, in the present invention the sensing member is reciprocatingly displaced over a range of from the one-face side to the counter-face side of the stack of sheets to thereby sense the one-circulation of the sheet. Accordingly, the movement range of the sensing member becomes narrowed, with the result that it is possible to miniaturize the sheet sensing device.

In contrast to the prior art wherein the sensing means are respectively disposed on the one-face side where the retracted position is located and on the counter-face side where the home position is located, since in the present invention the sensing means is disposed on the one-face side, it is possible to reduce the number of the sensing means and thereby sense one sheet circulation with a simple construction.

Also, the present invention is characterized in that a length L1 from a base end to a tip end of the sensing member which prevails when the respective bar-shaped members are disposed linearly, a distance L2 from the base end of the sensing member to the side face of the stack of sheets and a length L3 of the bar-shaped member on the base end side of the sensing member are selected to satisfy a relationship of L1> L2>L3.

According to the present invention, by selecting the above-mentioned lengths to satisfy a relationship of L1>L2>L3, it is possible to reliably obtain the above-mentioned functions.

Also, the present invention is characterized by comprising a return spring which causes linear restoration of the bar-shaped members, when the tip end of the sensing member is bent toward the counter-face side has passed the side face of the stack of sheets.

According to the present invention, when the tip end of the sensing member is bent toward the counter-face side has passed the side face of the stack of sheets, the bar-shaped members are linearly restored by the return spring. Accordingly, it is possible to reliably prevent mis-installation of the sensing member onto the sheets or the catching of such sheets by the sensing member, with the result that the high speed operation becomes possible.

Also, the present invention is characterized in that the sensing member is swingingly displaceable about the base end side thereof.

According to the present invention, since the sensing member is swingingly displaceable about the base end side thereof, the tip end of the sensing member can be reciprocatingly displaced in the direction of stacking of the sheets.

Also, the present invention has the sheet sensing device which is made to have an arrangement in which the stacked sheets are introduced sequentially from the top face side which is the one-face side into the conveying path and are returned to the bottom face side which is the counter-face side, and is characterized in that the sheet sensing device comprises urging means for urging always the sensing member toward the top face side of the stack of sheets and driving means for driving the sensing member so as to make this sensing member angularly displaceable toward the bottom face side of the stack of sheets.

According to the present invention, when the stacked sheets are introduced from the top face side thereof sequentially into the conveying path and are returned to the bottom face side thereof, the sensing member is first displaced by the driving means from the top face side of the stack of sheets to the bottom face side thereof. When the sensing member passes through the top face side by repetition of the conveying operation, the sensing member is urged by the urging means to the top face side of the stack of sheets and is sensed by the sensing means. The one-circulation of the sheets can be sensed in this way.

Also, the present invention has the sheet sensing device which is made to have an arrangement in which the stacked sheets are introduced sequentially from the bottom face side which is the one-face side into the conveying path and are returned to the top face side which is the counter-face side, and is characterized in that the sheet sensing device comprises driving means for driving the sensing member so as to make this sensing member annually displaceable toward the top face side of the stack of sheets.

According to the present invention, when the stacked sheets are introduced from the bottom face side thereof sequentially into the conveying path and are returned to the top face side thereof, the sensing member is first displaced by the driving means from the bottom face side of the stack of sheets to the top face side thereof. When the sensing member passes through the bottom face side by repetition of the conveying operation, the sensing member is moved by the gravitational force to the bottom face side of the stack of sheets and is sensed by the sensing means. The one-circulation of the sheets can be sensed with a simple construction in this way.

Also, the present invention is characterized in that the respective bar-shaped members are connected mutually angle displaceably to each other so that the angle that is defined between an upper face of an uppermost sheet located over the sensing member and this sensing member or the angle that is defined between a lower face of a lowermost sheet located under the sensing member and this sensing member may be in a range of 10° or less.

According to the present invention, by connecting the respective bar-shaped members to each other in such a manner as for these members to be angularly displaceable so as for this angle to fall within the above-mentioned range, the sensing member reliably abuts on a face of the stack of sheets, with the result that, for example, the sensing member can be prevented from kicking up the sheets despite the sheets being still existent on the sensing member, with the result that the one circulation of the sheet conveyance is erroneously detected. In even a case where conveying a large number of sheets or conveying the sheets each having a relatively large thickness, it is possible to reliably detect the one sheet circulation.

Also, the present invention is characterized in that the driving means is a solenoid.

According to the present invention, by using the solenoid as the driving means, it is possible to easily control the operation of the sensing member and also to construct the device inexpensively.

Also, the present invention is characterized by comprising control means for, with the retracted position being set on the top face side of the stack of, sheets, causing angle displacement to the bottom face side of the stack of sheets, by the driving means, of the sensing member which, at the time of starting the conveyance, is disposed at its retracted position by the urging force of the urging means and for causing abutment of the sensing member onto the bottom face of the stack of sheets.

According to the present invention, when introducing the stacked sheets sequentially from the top face side into the conveying path and returning the sheets to the bottom face side, the retracted position is set on the top face side of the stack of sheets. The sensing member which at the initial stage of the conveyance is disposed at the retracted position is angle displaced toward the bottom face side of the stack of sheets and is thereby made to abut on the bottom face of the stack of sheets. The conveying operation is repeated in this way, whereby the above-mentioned function can be obtained.

Also, the present invention is characterized by comprising control means for, with the retracted position being set on the bottom face side of the stack of sheets, causing angle displacement to the top face side of the stack of sheets, by the driving means, of the sensing member which at the time of starting the conveyance is disposed at its retracted position by the gravitational force and for causing abutment of the sensing member onto the top face of the stack of sheets.

According to the present invention, when introducing the stacked sheets sequentially from the bottom face side into the conveying path and returning the sheets to the top face side, the retracted position is set on the bottom face side of the stack of sheets. The sensing member which at the initial stage of the conveyance is disposed at the retracted position is angle displaced toward the top face side of the stack of sheets and is thereby made to abut on the top face of the stack of sheets. The conveying operation is repeated in this way, whereby the above-mentioned function can be obtained.

Also, the present invention is characterized by comprising moving means for moving the base end side of the sensing member in the direction of stacking of the sheets.

According to the present invention, the base end side of the sensing member is moved in the direction of stacking of the sheets. Accordingly, the sensing member can reliably abut on a face of the stack of sheets, with the result that it is possible to prevent erroneous sensing of one circulation of the sheet conveyance. Also, in even a case where conveying a large number of sheets or conveying relatively thick sheets, it is possible to reliably detect the one sheet circulation.

Also, the present invention is characterized by comprising a stopper which is provided at a connecting portion of the bar-shaped members of the sensing member and which is intended to limit to a preset, or lower than preset, degree of angle the angular displacement of the bar-shaped members in a direction that is different from the bending direction.

According to the present invention, the angular displacement in the direction that is different from the bending direction is limited by the stopper to a preset, or lower than preset, degree of angle. Accordingly, the sensing member reliably abuts at an appropriate degree of angle on the face of the stack of sheets to thereby enable erroneous sensing of one circulation of the sheet conveyance.

The present invention provides a sheet sensing device for repeating a conveying operation of introducing stacked sheets one by one from a one-face side of the stack of sheets into a prescribed conveying path and returning the introduced sheet from the conveying path to a face of the stack counter to the one-face of the stack to sense whether or not the sheet conveying operation has made a one circulation, the sheet sensing device comprising:

a bar-shaped sensing member;

moving means for reciprocatingly displacing the sensing member in a direction of stacking of the sheets;

sensing means for disposing the sensing member on the counter-face side of the stack of sheets at an early stage to detect that the sensing member has passed through the one-face side, and thereby sensing that the conveying operation of the sheets has made the one circulation, wherein the sensing member is fixed to the moving means so that, when being displaced from the one-face side to the counter-face side, a tip end of the sensing member passes a surface side of the stack of sheets under a condition of being bent to be a parallel to a direction of stacking of sheets, and when being displaced from the counter-face side to the one-face side, the tip end can abut on a face of the stack of sheets under a condition of being substantially vertical to the direction of stacking of sheets.

According to the present invention, the sensing member is displaced by the moving means from the one-face side of the stack of sheets to the counter-face side thereof. At this time, the sensing member is bent to be substantially parallel to the moving means and the tip end thereof passes along the side face of the stack of sheets. In this way, at the initial stage of conveyance of the sheet, the sensing member is disposed on the counter-face side of the stack of sheets and, at this time, the sensing member becomes substantially vertical to the moving means whereby the tip end thereof abuts on the face of the stack of sheets. The conveying operation is repeated in such a way. The sensing means senses that the sensing member has passes through the one-face side to thereby sense that the conveying operation of the sheets has made its one circulation.

The sensing member is reciprocatingly displaced over a range of from the one-face side to the counter-face side of the stack of sheets to thereby sense the one-circulation of the sheet. Accordingly, the movement range of the sensing member becomes narrowed, with the result that it is possible to miniaturize the sheet sensing device. Also, since the sensing means is disposed on the one-face side, it is possible to reduce the number of the sensing means and thereby sense one sheet circulation with a simple construction. Since it is sufficient that the distance from the base end of the sensing member to the side face of the stack of sheets be set by the value which is needed for the sensing member to be bent, the device can be further made small in size.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
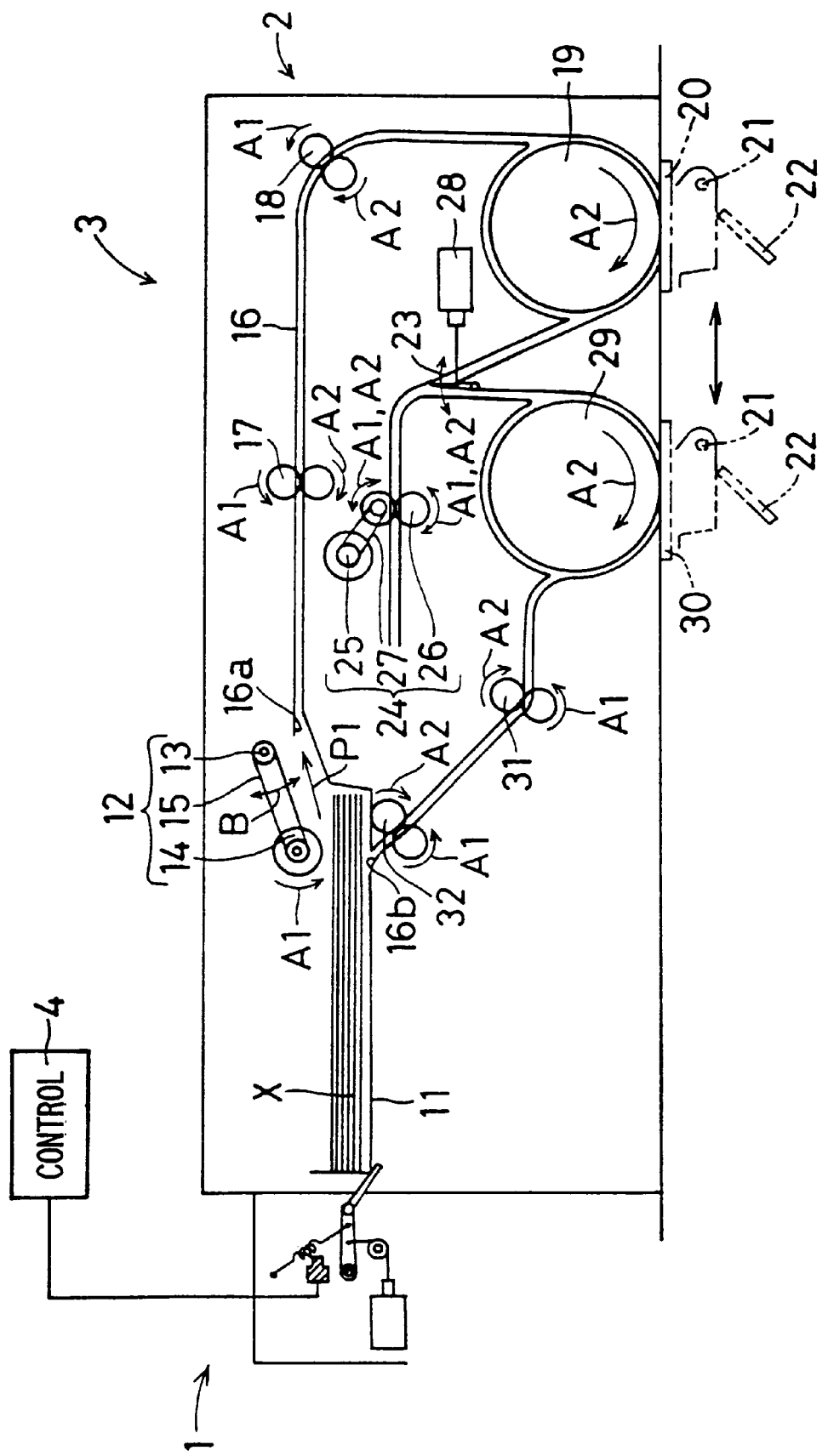
FIG. 1 is a side view illustrating a schematic construction of an RDH 3 including a one-circulation sensing unit 1 of a first embodiment of the present invention.

Now referring to the drawings, preferred embodiments of the invention are described below.

FIG. 1 is a side view illustrating a schematic construction of an RDH 3 that includes a one-circulation sensing unit 1 according to a first embodiment of the present invention. The RDH 3 is equipped schematically with a one-circulation sensing unit 1 and a document conveying unit 2.

Documents X stacked and set on a document tray 11 in a document conveying unit 2 are conveyed by paper sheet feeding device 12 one at a time from the top face side in the conveying direction P1 and then are carried into a conveying path 16. The paper sheet feeding device 12 has a paper sheet feeding roller 14 that is rotatably fixed to one end portion of a supporting member 15 and the other end portion of the supporting member 15 is fixed as a shaft 13 to that the paper sheet feeding roller 14 may be swingable in the direction B in which the paper feeding roller 14 may be moved toward or away from the documents X. By causing the paper sheet feeding roller 14 to abut on the upper face of the documents X and in this state rotating the paper sheet feeding roller 14 in the rotating direction A1 that goes along the conveying direction P, the document X is carried from a conveying entrance 16a that faces the upper face of the document X into the conveying path 16.

The document X which is conveyed into the conveying path 16 reaches a first exposure roller 19 by conveying rollers 17 and 18. The conveying rollers 17 and 18 are each composed of a pair of rollers abutting each other, whereby the document X is conveyed by respectively rotating the paired rollers in mutually opposite directions A1 and A2. By rotating the roller 19 in the direction A2, the document X that has reached the first exposure roller 19 passes while being pressed against the top face of a first exposure glass 20 of a first reading portion of the main body of the copying apparatus on which the RDH 3 is mounted. In the first reading portion, the image of one face of the document X is read by an optical system that includes a copying lamp 21 and mirror 22 of the main body of the copying apparatus.

Subsequently, the document X reaches an inverting portion 24 that is constructed including an inverting roller 26, through a gate 23 switched by a solenoid 28 to the inverting portion 24 by a solenoid 28 in such a manner as to convey the document X thereinto. The inverting roller 26 is composed of a pair of rollers abutting on each other between which the path 16 is interposed. To the one roller there is supplied through a belt 27 the power from a motor 25 that can be rotated in the both directions. By, after having carried the document X into the inverting portion 24, switching the rotation direction of the inverting roller 26 and switching the gate 23 by the solenoid 28 so that the document X can be carried out from the inverting portion 24, the document X reaches a second exposure roller 29.

By rotating the roller 29 in the direction A2, the document X that has reached a second exposure roller 29 passes while being pressed against a second exposure glass 30 of a second reading portion of the main body of the copying apparatus. In the second reading portion, the image of the other face of the document X is read by means of an optical system of the main body of the copying apparatus. It is to be noted that the copying lamp 21 and mirror 22 that constitute the optical system of the main body of the copying apparatus is constructed being movable between the first and second reading portions.

Further, the document X is returned again to the document tray 11 by conveying rollers 31 and 32. The conveying rollers 31 and 32 are each composed of a pair of rollers that abut on each other with the path 16 in between, whereby the document X is conveyed by rotating each pair of rollers in mutually opposite directions A1 and A2. A conveyance port 16b of the conveyance path 16 is faced toward the bottom face of the stack of documents X and the document X that is conveyed outside is returned to the bottom face side of the stack of documents X.

In the document conveying unit 2, there is repeated the above-mentioned conveying operation of introducing the stacked documents X one by one from the top face side into the conveying path 16 and returning the document X from the conveyance path 16 again to the bottom face side of the stack of documents X. When the conveying operation has been performed in the document conveying unit 2, the one-circulation sensing unit 1 senses whether or not the conveyance of the document X has made its one circulation. The sensed result is supplied to a control portion 4 in the main body of the copying apparatus.

Figure 2:
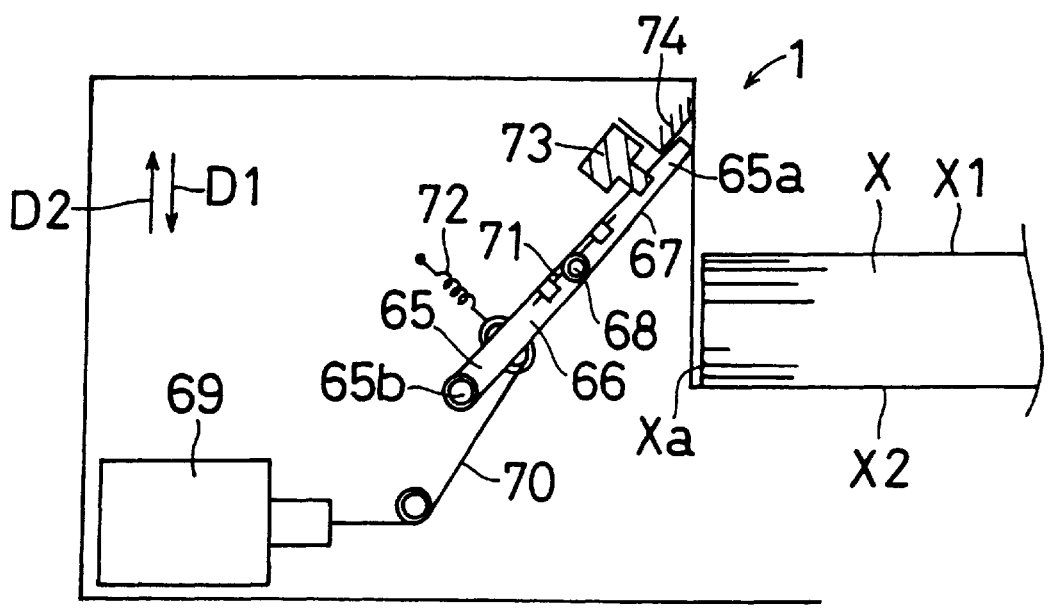
FIG. 2 is a side view illustrating the one-circulation sensing unit 1 on an enlarged scale.

FIG. 2 is a side view illustrating the one-circulation sensing unit 1 on an enlarged scale. The one-circulation sensing unit 1 includes a sensing member 65 and a sensor 73. The sensing member 65 has a tip end portion 65a which can be reciprocatingly displaced in the direction of stacking of the documents X. The sensing member 65 is bent when the tip end portion 65a is displaced from the top face X1 side to the bottom face X2 side of the stack of documents X and at the time of this displacement the tip end portion 65a can pass along the side face Xa of the stack of documents X. Also, when the tip end portion 65a is displaced from the bottom face X2 side to the top face X1 side of the stack of documents X, the sensing member becomes substantially linear, whereby the tip end portion 65a can abut on a face of the document X.

Specifically, the sensing member 65 is displaceable while being swung about a base end portion 65b that is fixed to, for example, a housing that encloses the one-circulation sensing unit 1 and the sensing member 65 is constructed by plural bar-shaped members (in this embodiment, two) 66 and 67 being connected by a connecting member 68. The sensing member 65 is connected to a solenoid 69 through a wire 70 and, by making the solenoid 69 on, is displaced in the direction D1 of being moved toward the bottom face X2 of the document. At this time, the connecting portion of the bar-shaped members 66 and 67 is bent toward the bottom face X2 side.

Also, a return spring 71 is provided at the connecting portion so that when the tip end portion 65a of the bent sensing member 65 has passed along the side face Xa of the stack of documents X, the respective bar-shaped members 66 and 67 may become linear. Further, the sensing member 65 has, for example, its one end portion always urged in the direction D2 of being moved toward the top face X1 of the document by a spring 72 that is fixed to the housing. It is to be noted that the document tray 11 has formed therein a notched portion that permits the passage of the sensing member 65 therethrough.

The sensor 73 senses that, with the sensing member 65 being initially disposed on the bottom face X2 side of the stack of documents X, the sensing member 65 has passed from the top face X1 side. The control portion 4 senses in response to the output from the sensor 73 that the conveying operation of the document X has made its one circulation. In this embodiment, the sensor 73 is provided above the stack of documents X and senses that, for example, the sensing member 65 that is pulled up by the spring 72 and is regulated by a stopper 74 abuts on the sensor 73. Also, the position that is regulated by the stopper 74 is set to be a retracted position (home position). The retracted position is set at a position that does not hinder the conveyance of the document X into or out of the document tray 11.

Figure 3:
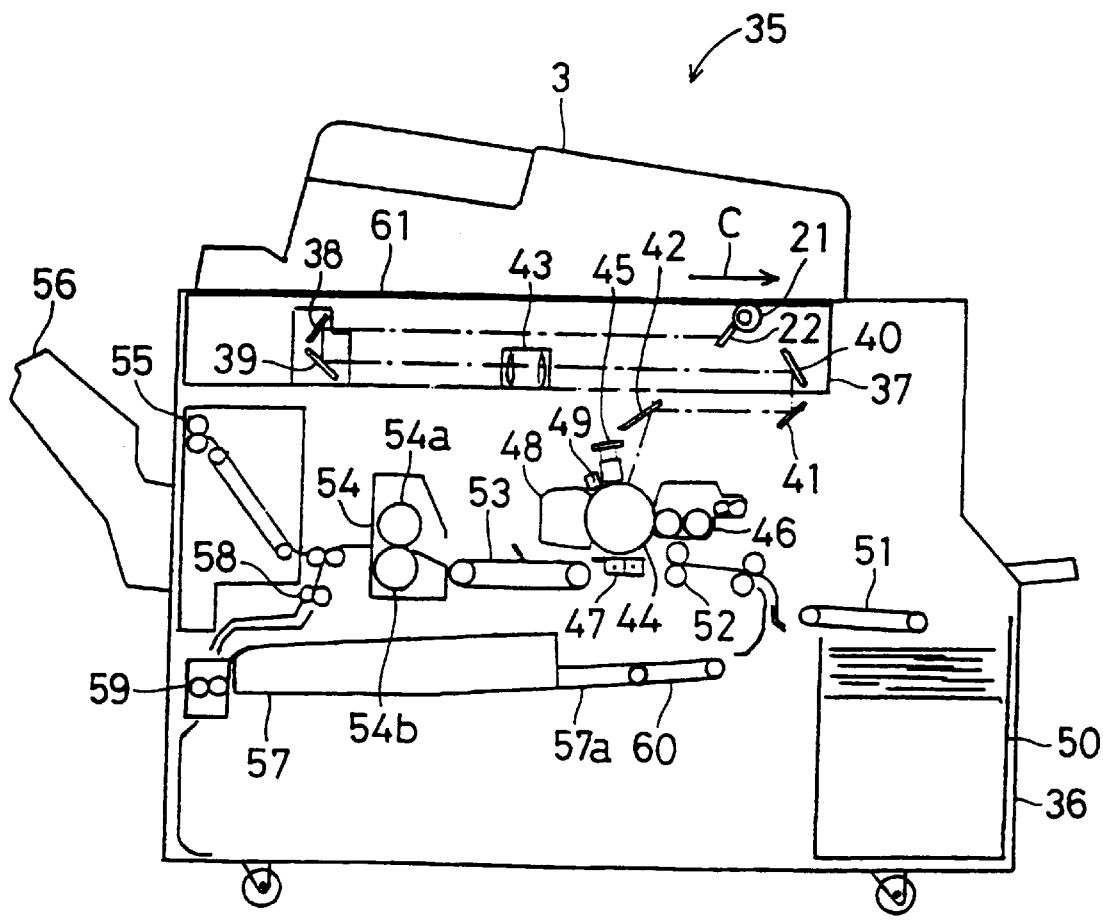
FIG. 3 is a side view illustrating a copying apparatus 35 including the RDH 3 and a main body 36 of the copying apparatus.

FIG. 3 is a side view illustrating a copying apparatus 35 that is constructed including the RDH 3 and the main body of the copying apparatus. The copying apparatus 35 reads the image of the document X that is conveyed by the RDH 3 and can copy this image onto a prescribed sheet of paper. On the main body 36 of the copying apparatus there is mounted the RDH 3 that conveys the sheet-like document X. At an upper portion of this main body, the first reading portion is set at the position of opposing the first exposure roller 19 of the RDH 3, whereby the first exposure glass 20 is provided there. The second reading portion is set at the position of opposing the second exposure roller 29, whereby the second exposure glass 30 is provided.

When the light from the copying lamp 21 of an optical system 37 which is realized by, for example, a halogen lamp is radiated onto the document X that has reached the first exposure roller 19 in the above-mentioned way, the light that has been reflected from this document X is imaged onto a photosensitive body 44 through mirrors 22, 38 and 39 and zoom lens 43 and mirrors 40 to 42.

The photosensitive body 44, for example, in which a photoconductive layer is formed on a surface of a drum-shaped base member, is rotatably fixed. Also, the surface of the photosensitive body 44 is charged uniformly to a prescribed potential by an electric charger 45, whereby there is formed on the photosensitive body 44 by the imaged light an electrostatic latent image that corresponds to the image. This electrostatic latent image is developed into a toner image by a developer 46. The toner image is transferred onto a recording sheet of paper by a transferrer 47. The recording sheet of paper is fed from a recording paper sheet tray 50 by a paper sheet feeder 51 and is synchronized with the timing with which the photosensitive body 44 rotates by resist rollers 52.

The recording paper having had the toner image transferred thereonto is conveyed to a fixer 54 by a conveying device 53. The fixer 54 is constructed including a heat roller 54a that is disposed on the side of the transferred toner image and heated to a prescribed temperature and a pressure roller 54b that is disposed on a side opposite thereto and used to pressurize the recording paper with an appropriate level of pressure in cooperation with the heat roller 54a, to thereby heat and fix the toner image on the recording paper. It is to be noted that the toner image on the photosensitive body 44 is removed by a cleaning device 48 and the photosensitive body 44 is subjected to static elimination by a static eliminator 49. In the case of copying on only one face alone of the recording paper, the recording paper is discharged through a paper discharging portion 55 into, for example, a finisher portion 56 that is vertically movable with respect to this paper discharging portion 55.

On the other hand, in the case of copying, for example, the images depicted on both faces of the document X onto both faces of the recording paper respectively, the recording paper is conveyed to a switch back conveyance portion 59 by a conveying device 58, whereby the feeding direction of the recording paper is inverted between a tip end and a rear end of the recording paper, whereby the obverse and reverse faces are inverted from each other and the resulting recording paper is conveyed to an intermediate tray 57. Also, in the case of copying further on one face of the recording paper, the recording paper is conveyed directly to the intermediate tray 57 not through the switch back conveyance portion 59.

The recording paper placed on a placing base 57a of the intermediate tray 57 is conveyed by a paper re-feeding device 60 from a lowermost portion side again to the resist roller 52 on a sheet by sheet basis, whereby the image is copied onto the counter-face or one face of the recording paper on which no copying is yet performed. At this time, the light from the copying lamp 21 of the optical system 37 that is moved is radiated onto the document X that has reached onto the second exposure roller 29, whereby the light reflected from the document X is imaged onto the photosensitive body 44 through the mirror 22 and the like. The recording paper on which the image is copied in the same manner as in the case of the copying thereof onto the one face is discharged into the finisher portion 56 through the paper discharging portion 55.

Also, on the upper surface of the main body of the copying apparatus there is provided a document placing base 61 separately from the RDH 3, whereby in the copying apparatus 35 the document is placed on the document placing base 61 so as to enable the image to be read therefrom. In this case, a first mirror base that is composed of the copying lamp 21 and mirror 22 of the optical system 37 and a second mirror base that is composed of mirrors 40 and 41 are moved in the direction C to thereby scan the document on the document placing base 61 optically. The light reflected from the document X is imaged onto the rotating photosensitive body 44 through the mirror 22 and the like.

Figure 4:
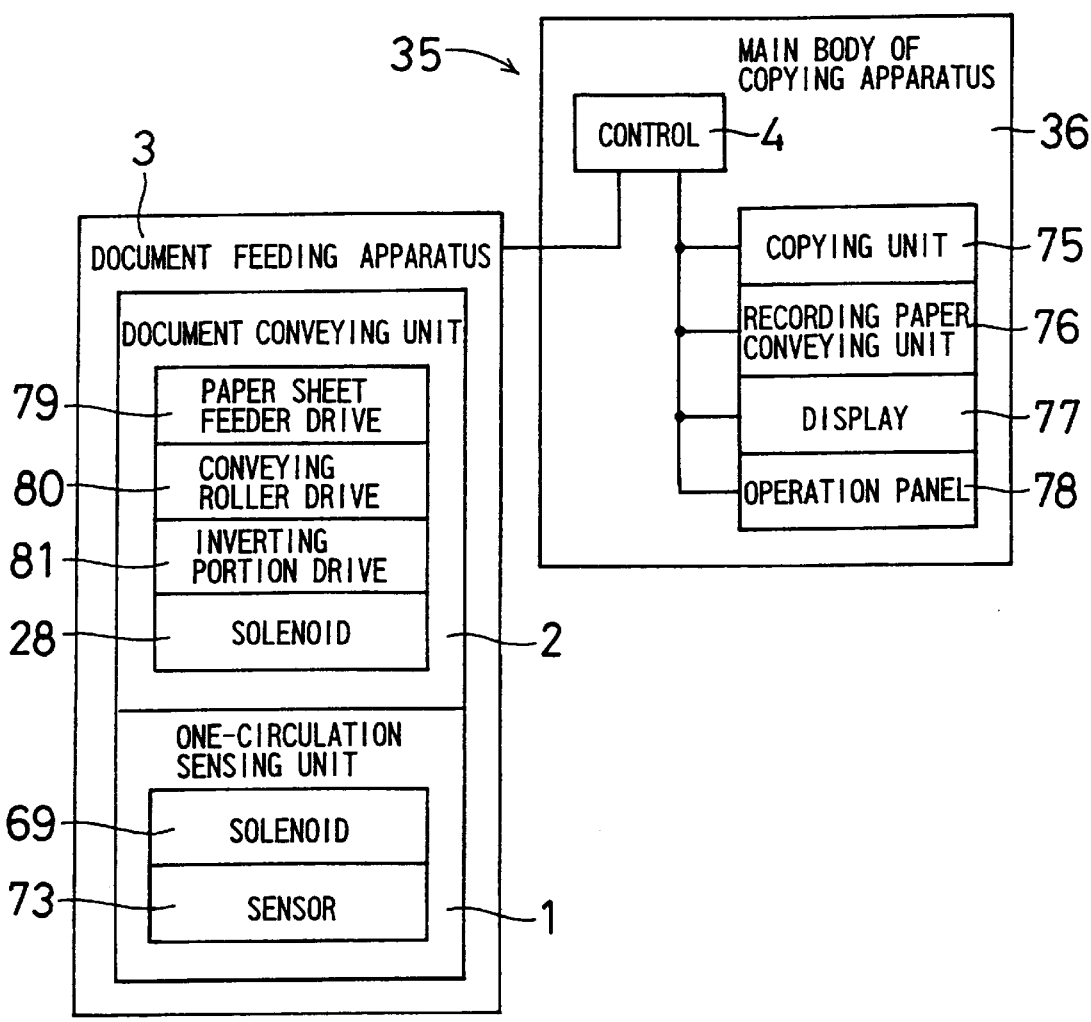
FIG. 4 is a block diagram illustrating the electric construction of the copying apparatus 35.

FIG. 4 is a block diagram illustrating the electric construction of the copying apparatus 35. The main body 36 of the copying apparatus is constructed including the control portion 4 for controlling the entire operation totally, a copying unit 75 that includes devices such as the optical system 37 that have direct relevancy to the copying operation, a recording paper conveying unit 76 that includes the rollers and the like which concern the conveyance of the recording paper, a displaying portion 77 for informing the copying operation to a relevant operator and an operation panel 78 for designating the commencement or stoppage of the copying operation.

The operation of the RDH 3 is controlled by the control portion 4 and this RDH 3 is constructed including the one-circulation sensing unit 1 and the document conveying unit 2. The one-circulation sensing unit 1 includes the solenoid 69 and the sensor 73. The document conveying unit 2 includes a paper sheet feeder driving portion 79 for driving the paper sheet feeding device 12, a conveying roller driving portion 80 for driving the conveying rollers, an inverting portion driving portion 81 for driving the inverting portion 24 and the solenoid 28.

Figure 5:
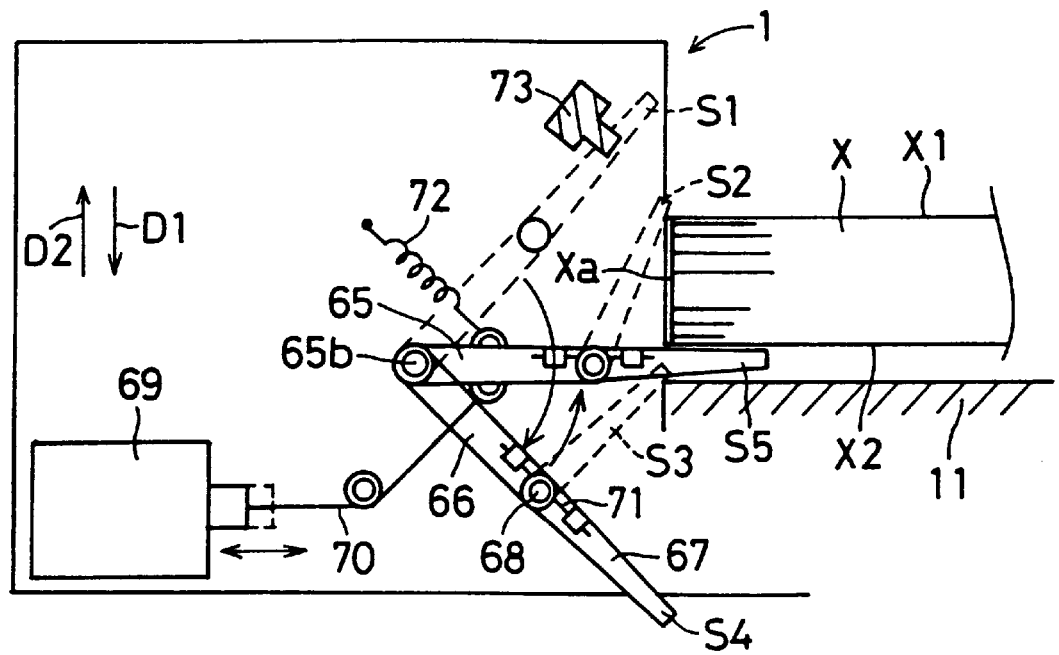
FIG. 5 is a side view illustrating the operation of the one-circulation sensing unit 1.

FIG. 5 is a side view illustrating the operation of the one-circulation sensing unit 1. First, the sensing member 65 is disposed at its retracted position (home position) by the urging force of the spring 72 (S1). Next, the solenoid 69 is made on, whereby the force pulling the sensing member 65 in the direction D1 is applied to this sensing member 65. The sensing member 65 retained substantially linearly by the return spring 68 abuts on the top face X1 of the stack of documents. Further application of the pulling force causes the sensing member 65 to be bent at the connecting member 68 in the direction D1 (S2). Yet further application of the pulling force causes the tip end portion 65a to abut on the side face Xa of the document while the sensing member 65 is kept bent and causes the sensing member 65 to be displaced about the base end portion 65b in the direction of D1 (S3).

When the tip end portion 65a has moved away from the side face Xa of the document, the sensing member 65 becomes substantially linear by the action of the return spring 71 (S4). As a result of this, it is possible to prevent the mis-installation of the sensing member 65 with respect to the document X or the catching thereof by the sensing member, with the result that the high speed operation becomes possible.

The sensing member 65 disposed on the bottom face X2 side of the document in this way abuts on the bottom face X2 of the document by making the solenoid 69 off (S5). In this state, the conveying operation of the document X is started, whereby the documents X disposed on the sensing member 65 are sequentially disposed under the stack of documents and then the sensing member 65 is displaced about the base end portion 65b in the direction of D2. When the sensing member 65 passes through the top face X1 of the stack of documents, the sensing member 65 is disposed again at its retracted position by the urging force of the spring 72 (S1). The sensor 73 senses the sensing member 65 that is located at this time and generates an electric signal that indicates the sensing of the sensing member and send the electric signal to the control portion 4. The control portion 4 senses by this signal that the conveyance of the document X has made its one circulation. Thereafter, the control portion 4 determines, for example, whether further conveying the document or stopping the conveyance of the document and makes its control operation for controlling the operations of the respective members in order to execute either one of the both operations.

It is to be noted that the urging force of the spring 72 is selected to be a value at which when the document is placed at least one sheet on the sensing member 65 the sensing member 65 is not raised up to its retracted position and when the document ceases to exist on the sensing member this sensing member is raised up to its retracted position.

Figure 6:
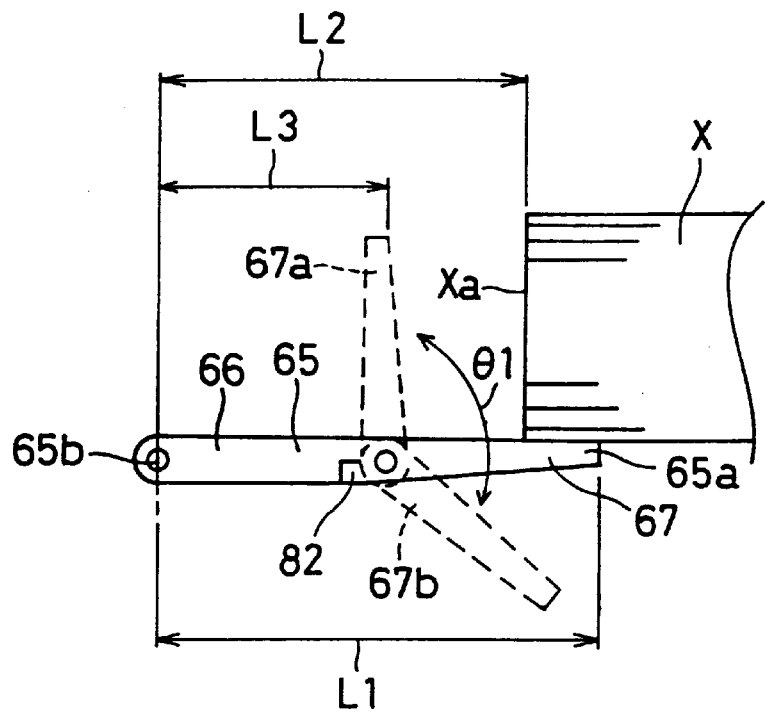
FIG. 6 is a view illustrating a positional relationship between a sensing member 65 and a stack of documents X.

FIG. 6 is a view illustrating the positional relation between the sensing member 65 and the documents X. Under the assumption that the length from the center of the axis of the base end portion 65b of the sensing member 65 to the foremost end of the tip end portion 65a which prevails when the respective bar-shaped members 66 and 67 are linearly disposed be represented by L1, the distance from the center of the axis of the base end portion 65b of the sensing member 65 to the side face Xa of the stack of documents X be represented by L2 and the length of the bar-shaped member 66 on the base end side of the sensing member 65 be represented by L3, the respective members are disposed so that the relation of L1>L2>L3 may hold true. By this disposing, it is possible to reliably execute the above-mentioned operations.

It is to be noted that the bar-shaped members 66 and 67 are constructed so as, when changing from the state of S2 that is illustrated in FIG. 5 to the state of S3, to be bent in the direction D1 and so as, when changing from the state of S5 to the state of S1, to be angularly displaceable in the direction D2. Accordingly, as illustrated in FIG. 6, the angularly displaceable range of the bar-shaped member 67 with respect to the bar-shaped member 66 is an angle of θ1 that is defined between the bar-shaped member 67a and the bar-shaped member 67b. With respect to the bar-shaped members 66 and 67 there is provided a stopper 82 for regulating the angle of displacement thereof in the direction of D2. For example, at the end portions of the bar-shaped member 66 and the bar-shaped member 67 on the mutually approaching side there may be formed mutually engageable engaging members that are displaceable by a prescribed degree of angle.

Figure 7A:
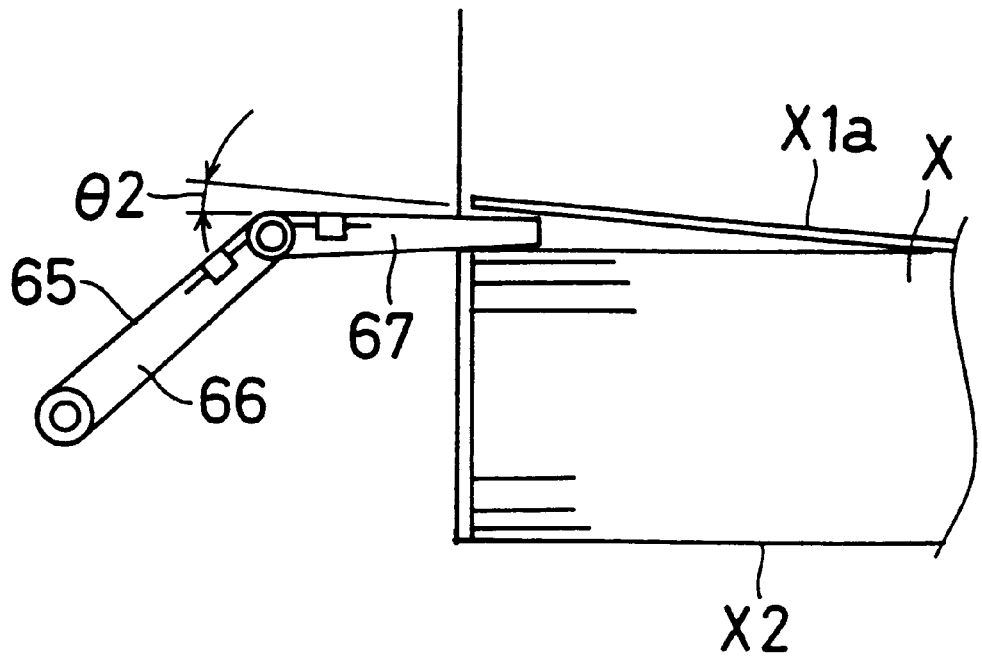
FIGS. 7A and 7B are detailed views illustrating operations when the sensing device is changed from a state of S5 illustrated in FIG. 5 to a state of S1, FIG. 7A illustrating the operation when bar-shaped members 66 and 67 are constructed so as to be angularly displaceable in a direction D2, FIG. 7B illustrating the operation when the bar-shaped members 66 and 67 are not constructed so as to be angularly displaceable in the direction D2.
Figure 7B:
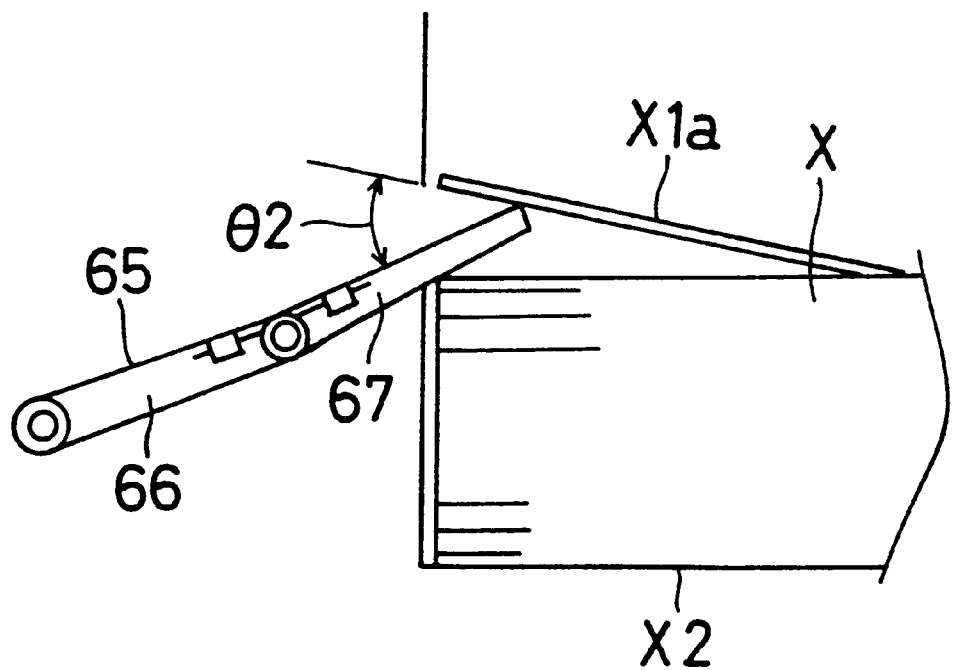

FIGS. 7A and 7B are detailed views illustrating the operation that is performed when the operation changes from the state of S5 to the state of S1 illustrated in FIG. 5. FIG. 7A illustrates the operation which prevails when the bar-shaped members 66 and 67 is constructed in such a manner as to be angularly displaceable in the direction D2 while, on the other hand, FIG. 7B illustrates the operation which prevails when the bar-shaped members 66 and 67 are not constructed to be angularly displaceable in the direction D2.

When the sensing member 65 is constructed angle displaceably as mentioned above under the assumption that the angle that is defined between the top face X1a of the document located on the sensing member 65 and this sensing member 65 in the mid-course of the conveying operation be represented by θ2, this angle θ2 can be made small. The sensing member 65 reliably abuts on the face of the stack of documents X, with the result that it is possible to prevent the sensing member 65 from kicking up the documents X despite the documents X being still existent on the sensing member 65 and prevent the sensing member 65 from sensing erroneously the one circulation of the document conveyance. Also, in even a case where conveying a large number of documents or conveying the documents each having a relatively large thickness, it is possible to sense the one circulation thereof reliably. It is to be noted that in order to obtain this effect, preferably, the stopper 82 is formed so that the angle θ2 may be in a range of 10° or less.

Figure 8A:
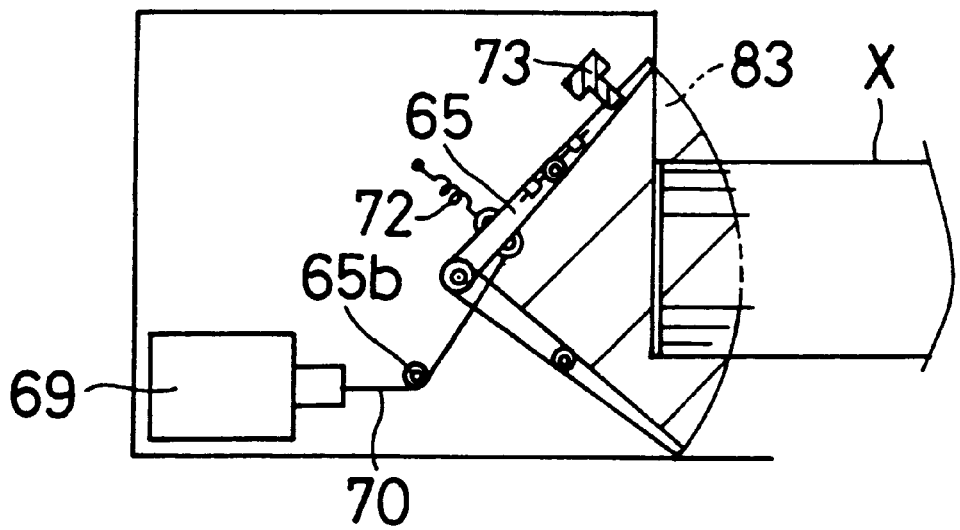
FIGS. 8A and 8B are views illustrating movement ranges of the sensing member, FIG. 8A illustrating a movement range 83 of the embodiment, FIG. 8B illustrating a movement range 84 of a prior art used as a comparative example.
Figure 8B:
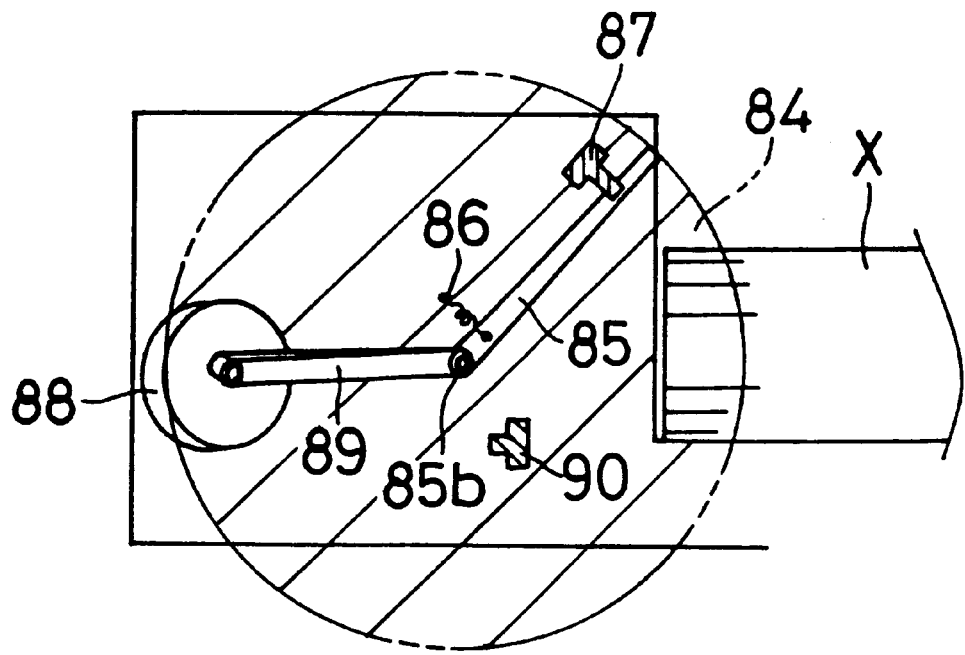

FIGS. 8A and 8B are views illustrating the movement range of the sensing member. FIG. 8A illustrates the movement range according to this embodiment and FIG. 8B illustrates the movement range 84 in the prior art as a comparative example. In this embodiment, the sensing member 65 is reciprocatingly displaced about the base end portion 65b over a range of from the retracted position thereof that is indicated by S1 in FIG. 5 to the position thereof that is located under the documents X and that is indicated by S4 in FIG. 5, to thereby sense one circulation of the document X. On the other hand, the conventional sensing member 85 is not constructed to be bent and, by having supplied thereto the power from the stepping motor 88 through the belt 89, makes its rotary movement about the base end portion 85b over a range 84 of a circle whose radius is the length of the sensing member 85. Accordingly, the movement range of the sensing member according to this embodiment becomes narrowed more than that of the conventional one, with the result that the one-circulation sensing unit 1 and hence the RDH 3 can be miniaturized.

Also, whereas in this embodiment the retracted position (home position) is set above the stack of documents X and at this position the sensor 73 is disposed, in the prior art the retracted position is set above the stack of documents X and at this position the sensor 87 is disposed and, under the stack of documents, the home position that is different from the retracted position is set and at this position the sensor 90 is disposed. Accordingly, in this embodiment, the number of the sensors can be reduced to thereby enable the sensing of one document circulation with a simple construction.

Further, in this embodiment, since the solenoid 69 is used instead of the stepping motor 88, it is possible to sense one document circulation with a simple control of applying a voltage to the solenoid 69 in response to the output from the sensor 73 and in addition to reduce the manufacturing cost.

Also, since when as in this embodiment the position that is located above the stack of documents X and is indicated by S1 in FIG. 5 is set to be the retracted position the solenoid 69 is made off to thereby enable the sensing member 65 to be retained at this retracted position, it is possible to reduce the power consumption. On the other hand, the position that is indicated by S4 in FIG. 5 may be set to be the retracted position. In this case, immediately after having placed the documents X on the tray 11, the document conveying operation can be started with the result that the high speed document feeding operation can be performed.

Figure 9:
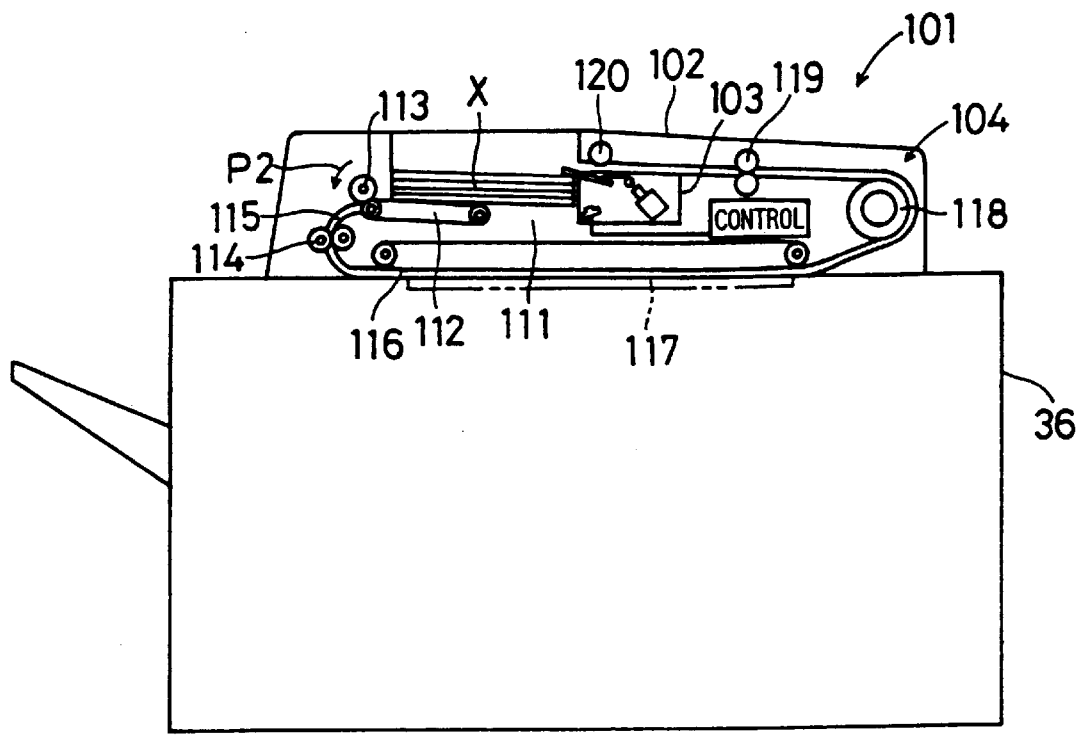
FIG. 9 is a side view illustrating a copying apparatus 101 composed of an RDH 102 including a one-circulation sensing unit 103 of a second embodiment and the main body 36 of the copying apparatus.

FIG. 9 is a side view illustrating a copying apparatus 101 that is constructed including an RDH 102 that includes a one-circulation sensing unit 103 according to a second embodiment of the present invention and the main body 36 of the copying apparatus. The main body 36 of the copying apparatus is constructed in the same manner as mentioned above and therefore its explanation is omitted. In the RDH 102 according to this embodiment, there is repeated a conveying operation of, conversely to the above-mentioned RDH 1, introducing the stacked documents X one by one from the bottom face side into the conveying path and returning the documents X from the conveying path again to the top face side of the stack of documents X. The RDH 102 schematically includes the one-circulation sensing unit 103 and a document conveying unit 104.

In the document conveying unit 104 the documents X that are stacked on a document tray 111 are conveyed by a paper feeding belt 112 from the bottom face side in the conveying direction P2 on a sheet by sheet basis and are conveyed into the conveying path 115. The paper feeding belt 112 is disposed in such a manner as to abut on the bottom face of the documents X. The document X which is conveyed from the conveyance entrance faced to the bottom face of the stack of documents X into the conveyance path 115 reaches an exposure belt 116 by way of conveying rollers 113 and 114. The document X that has reached the exposure belt 116 passes while being pressed by this belt 116 against the surface of an exposure glass 117 in the reading portion of the main body of the copying apparatus on which the RDH 102 is mounted. In the reading portion, the image of the one face of the document X is read by the optical system of the main body of the copying apparatus. Subsequently, the document X is returned again to the document tray 111 by conveying rollers 118 to 120. A conveyance port of the conveying path 115 is faced to the top face of the stack of documents X, whereby the document X that is conveyed to the outside is returned to the top face side of the stack of documents X.

When in the document conveying unit 104 the conveying operation is executed, the one-circulation sensing unit 103 senses whether or not the conveyance of the document X has made its conveyance. The sensed result is supplied to the control portion 4.

Figure 10:
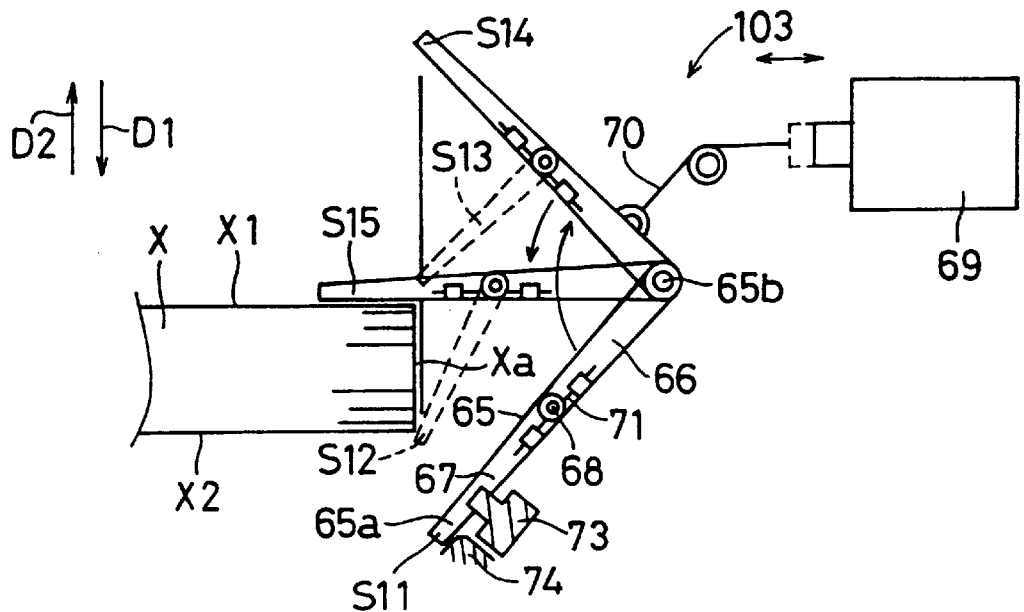
FIG. 10 a side view illustrating the one-circulation sensing unit 103 on an enlarged scale.

FIG. 10 is a side view illustrating the one-circulation sensing unit 103 on an enlarged scale. This one-circulation sensing unit 103 is constructed by the same members as those of the one-circulation sensing unit 1 except for the spring 72 and its constituent members are denoted by the same reference symbols. The sensing member 65 has its tip end portion 65a made reciprocatingly displaceable in the direction of stacking of the documents X. In this sensing member 65, when the tip end portion 65a is displaced from the bottom face X2 side to the top face X1 side of the stack of documents X, the sensing member 65 is bent with the result that the tip end portion 65a can pass along the side face Xa of the documents X. Also, when the tip end portion 65a is displaced from the top face X1 side to the bottom face X2 side of the stack of documents X, the sensing member 65 becomes substantially linear with the result that the tip end portion 65a can abut on the face of the document X.

Specifically, the sensing member 65 is swingingly displaceable about the base end portion 65b fixed to the housing and is constructed with the plural (in this embodiment, two) bar-shaped members 66 and 67 being connected to each other by the connecting member 68. The sensing member 65 is connected to the solenoid 69 through the wire 70 and, by making the solenoid on, is displaced in the direction D2 of its being moved toward the top face X1 side of the document. At this time, the connecting portion of the bar-shaped members 66 and 67 is bent toward the top face X1 side.

Also, when the tip end portion 65a of the bent sensing member 65 has passed the side face Xa of the stack of documents X, the respective bar-shaped members 66 and 67 are restored by the return spring 71 linearly. Further, the sensing member 65 is always urged by the gravitational force in the direction D1 of its being moved toward the bottom face X2 of the document. It is to be noted that the document tray 111 has formed therein a notch which permits the passage therethrough of the sensing member 65.

The sensor 73 senses that, with the sensing member 65 being disposed initially on the top face X1 side of the stack of documents X, this sensing member 65 has passed through from the bottom face X2 side. The control portion 4 senses in response to the output from this sensor 73 that the conveying operation of the document has made its one circulation. In this embodiment, the sensor 73 is provided under the stack of documents X and senses that the sensing member 65 which is pulled downward and stopped by the stopper 74 has abutted thereon. Also, the position that is regulated by the stopper 74 is set to be the retracted position (home position). The retracted position is set at a position having no hindrance to the conveyance of the document X into and out of the document tray 11.

Next, the operation of the one-circulation sensing unit 103 will be explained. First, the sensing member 65 is disposed at the retracted position (home position) by the gravitational force (S11). Next, the solenoid 69 is made on, whereby the force pulling the sensing member 65 in the direction D2 is applied thereto. The sensing member 65 which is retained substantially linearly by the return spring 68 abuts on the bottom face X2 of the stack of documents. Further application of the pulling force causes the sensing member 65 to be bent at the connecting member 68 in the direction D2 (S12). Yet further application of the pulling force causes the tip end portion 65a of the sensing member 65 to abut on the side face Xa of the document while the sensing member 65 is kept bent and causes the sensing member 65 to be displaced about the base end portion 65b in the direction of D2 (S13).

When the tip end portion 65a is moved away from the side face Xa of the stack of documents, the sensing member becomes immediately linear due to the action of the return spring 71 (S14). As a result, it is possible to prevent the mis-installation of the sensing member 65 with respect to the document X or the catching thereof by the sensing member, with the result that the high speed operation becomes possible.

The sensing member 65 disposed on the top face X1 side of the document in this way abuts on the top face X1 of the document by making the solenoid 69 off (S15). In this state, the conveying operation of the document X is started, whereby the documents X disposed under the sensing member 65 are sequentially disposed on the stack of documents and then the sensing member 65 is displaced about the base end portion 65b in the direction of D1. When the sensing member 65 passes through the bottom face X2 of the stack of documents, the sensing member 65 is disposed again at its retracted position by the gravitational force (S11). The sensor 73 senses the sensing member 65 that is located at this time and generates an electric signal that indicates the sensing of the sensing member and sends the electric signal to the control portion 4. The control portion 4 senses by this signal that the conveyance of the document X has made its one circulation. Thereafter, the control portion 4 determines, for example, whether further conveying the document or stopping the conveyance of the document and makes its control operation for controlling the operations of the respective members in order to execute either one of the both operations.

It is to be noted that, in order to reliably execute the above-mentioned operation, the relation among the length L1 from the foremost end of the tip end portion 65a of the sensing member 65 which prevails when the respective bar-shaped members 66 and 67 are linearly disposed to the center of the axis of the base end portion 65b of the sensing member 65, the distance L2 from the center of the axis of the base end portion 65b of the sensing member 65 to the side face Xa of the stack of documents X and the length L3 of the bar-shaped member 66 on the base end side of the sensing member 65 is selected to be L1>L2>L3 in the same way as explained in connection with FIG. 6.

Also, the bar-shaped members 66 and 67 are constructed so as, when changing from the state of S12 that is illustrated in FIG. 10 to the state of S13, to be bent in the direction D2 and so as, when changing from the state of S15 to the state of S11, to be angularly displaceable in the direction D1. Accordingly, the angularly displaceable range of the bar-shaped member 67 with respect to the bar-shaped member 66 is an angle of θ1 that is illustrated in FIG. 6. With respect to the bar-shaped members 66 and 67 there is provided a stopper 82 for regulating the angle of displacement thereof in the direction of D1, for example, in the same way as was stated previously.

When the sensing member 65 is constructed angle displaceably as mentioned above, there can be made small the angle θ2 that is defined between the bottom face of the document located under the sensing member 65 and this sensing member 65 in the mid-course of the conveying operation. Accordingly, the sensing member 65 reliably abuts on the face of the stack of documents X, with the result that it is possible to prevent the sensing member 65 from kicking down the documents X despite the documents X being still existent under the sensing member 65 and prevent the sensing member 65 from sensing erroneously the one circulation of the document conveyance. Also, in even a case where conveying a large number of documents or conveying the documents each having a relatively large thickness, it is possible to sense the one circulation thereof reliably. It is to be noted that in order to obtain this effect, preferably, the stopper 82 is formed so that the angle θ2 may be in a range of 10° or less.

Also, in this embodiment, the sensing member 65 senses the one circulation of the document by being reciprocatingly displaced about the base end portion 65b over a range of from the retracted position indicated by S11 in FIG. 10 to the position that is located above the stack of documents X and indicated by S14 in FIG. 10. Accordingly, the movement range of the sensing member according to this embodiment becomes narrowed more than that of the conventional one, with the result that the one-circulation sensing unit 103 and hence the RDH 102 can be miniaturized.

Also, since in this embodiment the retracted position (home position) is set below the stack of documents X and at this position the sensor 73 is disposed, the number of the sensors can be reduced to thereby enable the sensing of one document circulation with a simple construction.

Further, in this embodiment, since the solenoid 69 is used instead of the stepping motor 88, it is possible to sense one document circulation with a simple control and in addition to reduce the manufacturing cost.

Also, since when as in this embodiment the position that is located below the stack of documents X and is indicated by S11 in FIG. 10 is set to be the retracted position the solenoid 69 is made off to thereby enable the sensing member 65 to be retained at this retracted position, it is possible to reduce the power consumption. On the other hand, the position that is indicated by S14 in FIG. 10 may be set to be the retracted position. In this case, immediately after having placed the documents X on the tray 11, the document conveying operation can be started with the result that the high speed document feeding operation can be performed.

Furthermore, when comparing to the first embodiment, since the sensing member 65 is operated utilizing the gravitational force in place of the spring, the construction of the one-circulation sensing unit 103 can be simplified.

Figure 11:
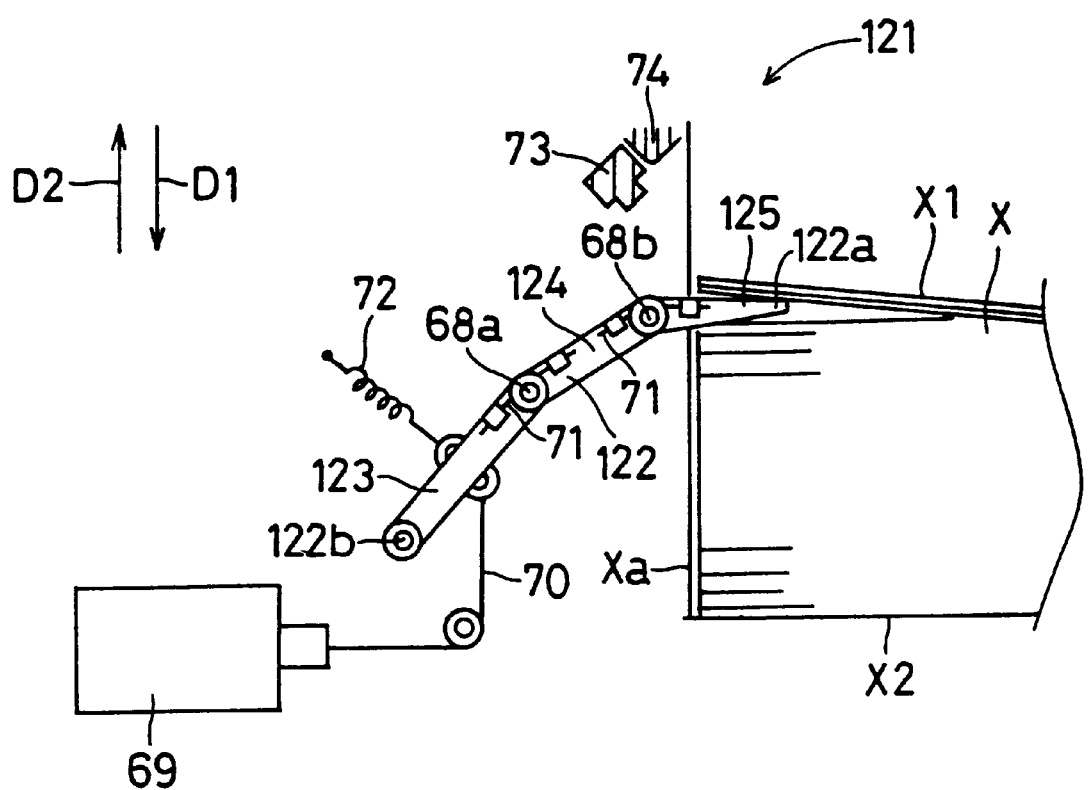
FIG. 11 is a side view illustrating an enlarged one-circulation sensing unit 121 of a third embodiment of the present invention.

FIG. 11 is a side view illustrating on an enlarged scale a one-circulation sensing unit 121 according to a third embodiment of the present invention. The one-circulation sensing unit 121 is constructed in substantially the same way as that in the case of the one-circulation sensing unit 1 excepting that the sensing member 122 is constructed using three bar-shaped members 123 to 125 that are the same constituent members are denoted by the same reference symbols and their explanation is omitted.

The sensing member 122 has its tip end portion 122a made reciprocatingly displaceable in the direction of stacking of the documents X. The sensing member 122 is bent when its tip end portion 122a is displaced from the top face X1 side to the bottom face X2 side of the stack of documents X, whereby the tip end portion 122a can pass along the side face Xa of the documents X. Also, when the tip end portion 122a is displaced from the bottom face X2 side to the top face X1 side of the stack of documents X, the sensing member 122 becomes substantially linear, whereby the tip end portion 122a can abut on the face of the documents X.

Specifically, the sensing member 122 is swingingly displaceable about the base end portion 122b fixed to the housing and is constructed with the bar-shaped members 123 and 124 being connected to each other by a connecting member 68a and with the bar-shaped members 124 and 125 being connected to each other by a connecting member 68b. The sensing member 122 that is connected to a solenoid 69 via a wire 70 is displaced, by the solenoid 69 being made on, in a direction D1 in which it moves toward the bottom face X2 of the stack of documents. At this time, the connecting portions of the bar-shaped members 123 to 125 are bent to the bottom face X2 side.

Also, return springs 71 are respectively provided on the connecting portions so that when the tip end portion 122a of the bent sensing member 122 has passed along the side face Xa of the stack of documents X, the respective bar-shaped members 123 to 125 may be restored linearly. Further, the sensing member 122 is always urged by the spring 72 in the direction D2 in which it moves toward the top face X1 of the stack of documents.

According to this embodiment, the movement range of the sensing member 122 becomes narrowed with the result that the one-circulation sensing unit 121 and hence the RDH can be miniaturized. Also, when the sensing member 122 is finely divided as in this embodiment, with the result that the angle θ2 can be made small, and the sensing member 122 can be reliably caused to abut on the face of the documents X that are stacked. Accordingly this enables more reliable prevention of the erroneous sensing of the circulation of the document conveyance.

It is to be noted that although in the third embodiment the explanation is given of the example of the sensing member 122 that is constructed by connecting the three bar-shaped members 123 to 125 to each other, the sensing member may be constructed by connecting four or more bar-shaped members in the same way. Also, it may be also arranged to convey the document from the bottom face side to the top face side of the stack of documents.

Figure 12:
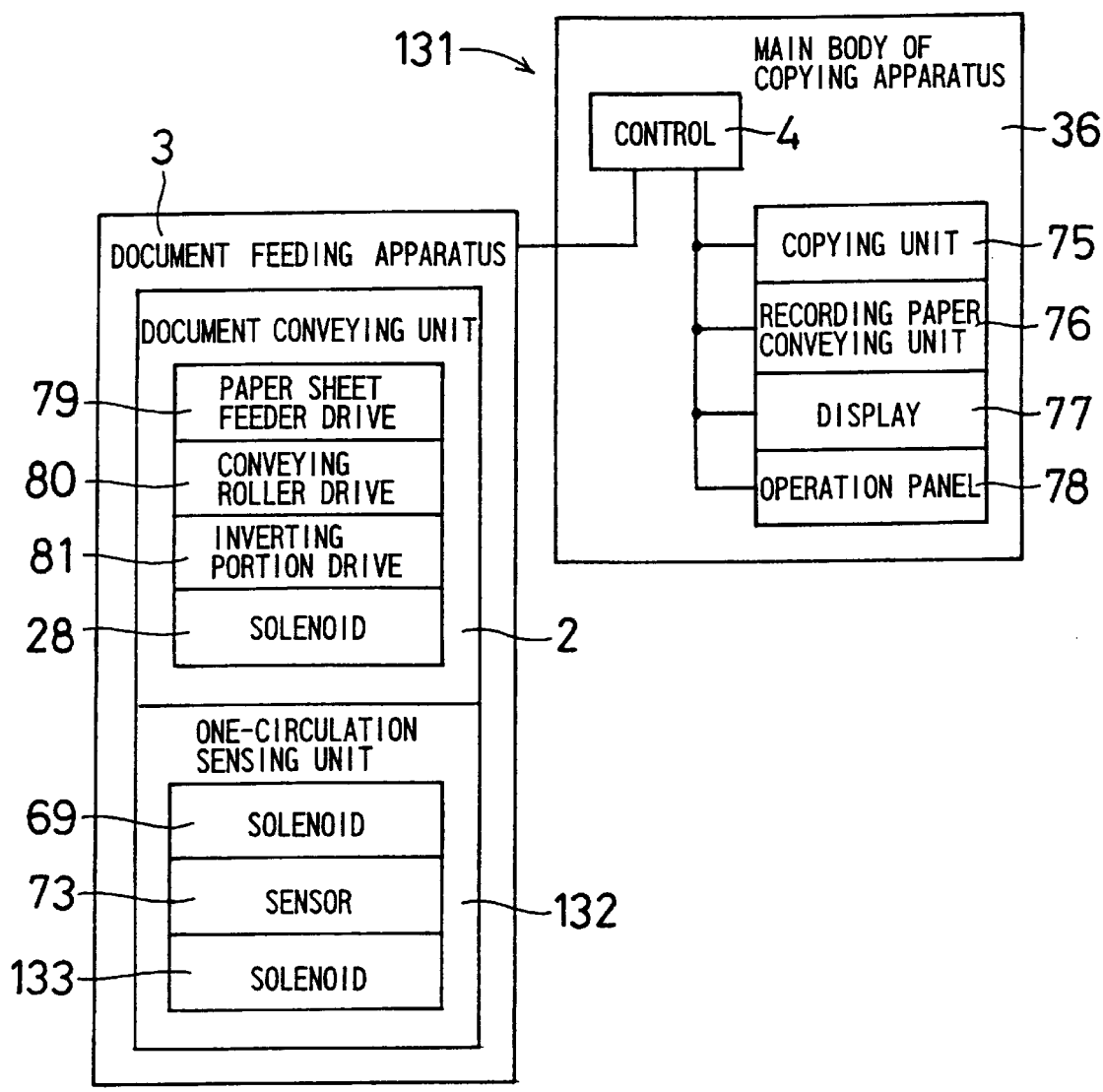
FIG. 12 is a block diagram illustrating the electric construction of a copying apparatus 131 including a one-circulation sensing unit 132 of a fourth embodiment of the present invention.

FIG. 12 is a block diagram illustrating the electric construction of a copying apparatus 131 that includes a one-circulation sensing unit 132 according to a fourth embodiment of the present invention. This copying apparatus is constructed in the same way as in the case of the copying apparatus 35 excepting that the one-circulation sensing unit 132 further includes the solenoid 133. The blocks that are similarly constructed are denoted by the same reference symbols and their explanation is omitted.

Figure 13A:
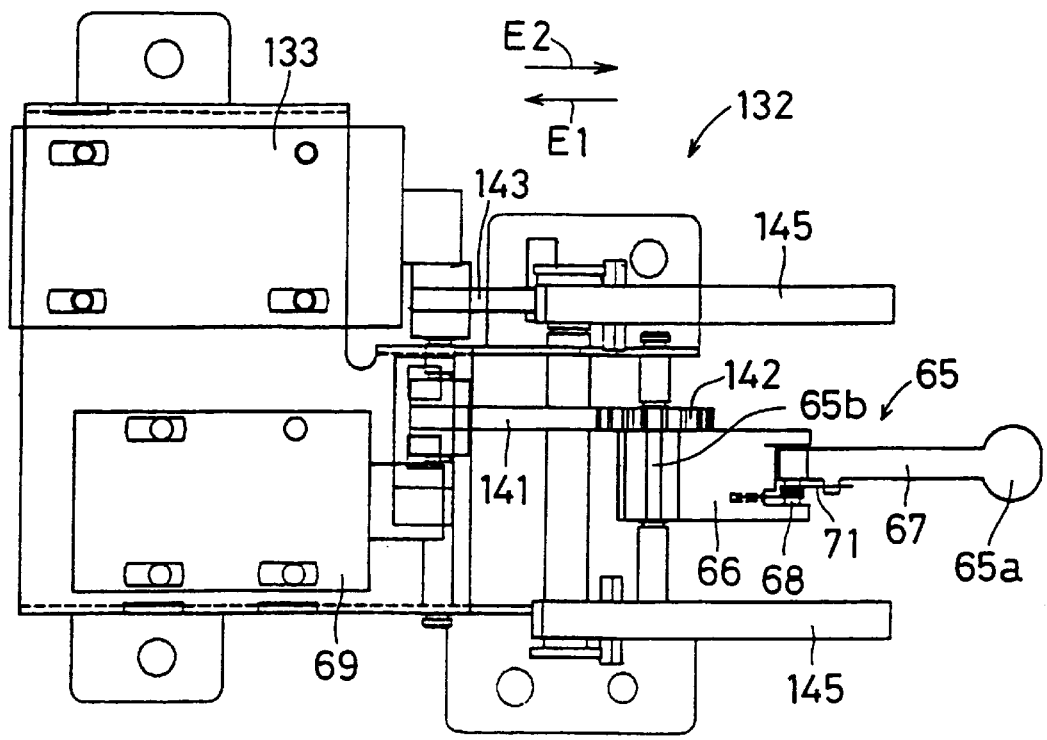
FIGS. 13A and 13B are views illustrating the construction of the one-circulation sensing unit 132, FIG. 13A being a plan view thereof, FIG. 13B being a side view thereof.
Figure 13B:
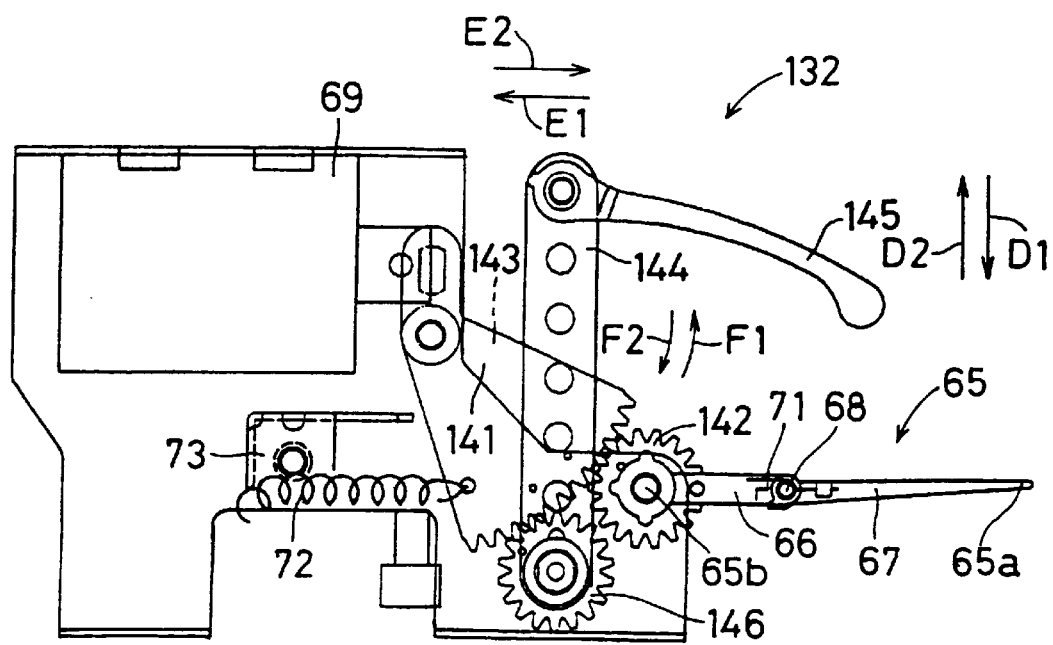

FIGS. 13A and 13B are views illustrating the construction of the one-circulation sensing unit 132. FIG. 13A is a plan view thereof and FIG. 13B is a side view thereof. The sensing member 65 is connected to the solenoid 69 through a swing member 141 and a gear 142 in place of the wire 70. When pulling this arrangement in the direction El by making the solenoid 69 on, the sensing member 141 is swung in the direction F1, whereby the sensing member 65 is displaced in the direction D1 through a gear 142 that is engaged with a gear that is formed in the side face of the sensing member 141. At this time, the connecting portion of the bar-shaped members 66 and 67 is bent to the side of the bottom face X2 of the stack of documents.

Also, by the swing member 141 being always urged in the direction F2 by the spring 72 whose one end portion is fixed to the housing, the sensing member 65 is always urged in the direction D2. Accordingly, when making the solenoid 69 off, the swing member 141 is swung in the direction F2 with the result that the sensing member 65 is displaced in the direction D2.

Also, by the sensor 73 being provided under the stack of documents X and sensing the pulling of the swing member 141 by the spring 72 in the direction F2, the sensor 73 senses that with the sensing member 65 being initially disposed on the bottom face X2 side of the stack of documents X the sensing member 65 has passed through the top face X1 side.

It is to be noted that the tip end portion 65a of the sensing member 65 may be formed in the shape of a plate that is disposed in parallel with the face of the documents X. By this forming, the sensing member 65 can be made to reliably abut on the face of the documents X and it is possible to prevent the sensing member 65 from passing through between the documents.

Also, the one-circulation sensing unit 132 according to this embodiment further includes a paper sheet pushing mechanism for the stack of documents X. Specifically, the unit includes a solenoid 133, swinging member 143, supporting member 144, paper sheet keeping member 145, and gear 146. When pulling in the direction E1 by making the solenoid 133 on, the swinging member 143 is swung in the direction F1, whereby the paper sheet keeping member 145 is displaced in the direction D1 through a gear 146 that is engaged with a gear formed in the side face of the sensing member 143 and that is fixed to the supporting member 144. The paper sheet keeping member 145 is supported on a tip end portion of the supporting member 144 to be swingable.

The swinging member 143 is always urged in the direction F2 by a spring not illustrated whose one end portion is fixed to the housing, whereby the paper sheet keeping member 145 is always urged in the direction D2. Accordingly, when the solenoid 133 is made off, the swinging member 143 is swung in the direction F2 and the paper sheet keeping member 145 is displaced in the direction D2.

By constructing in this way, the one-circulation sensing unit operates in the same manner as in the case of the first embodiment, with the result that the same effect can be obtained.

Figure 14:
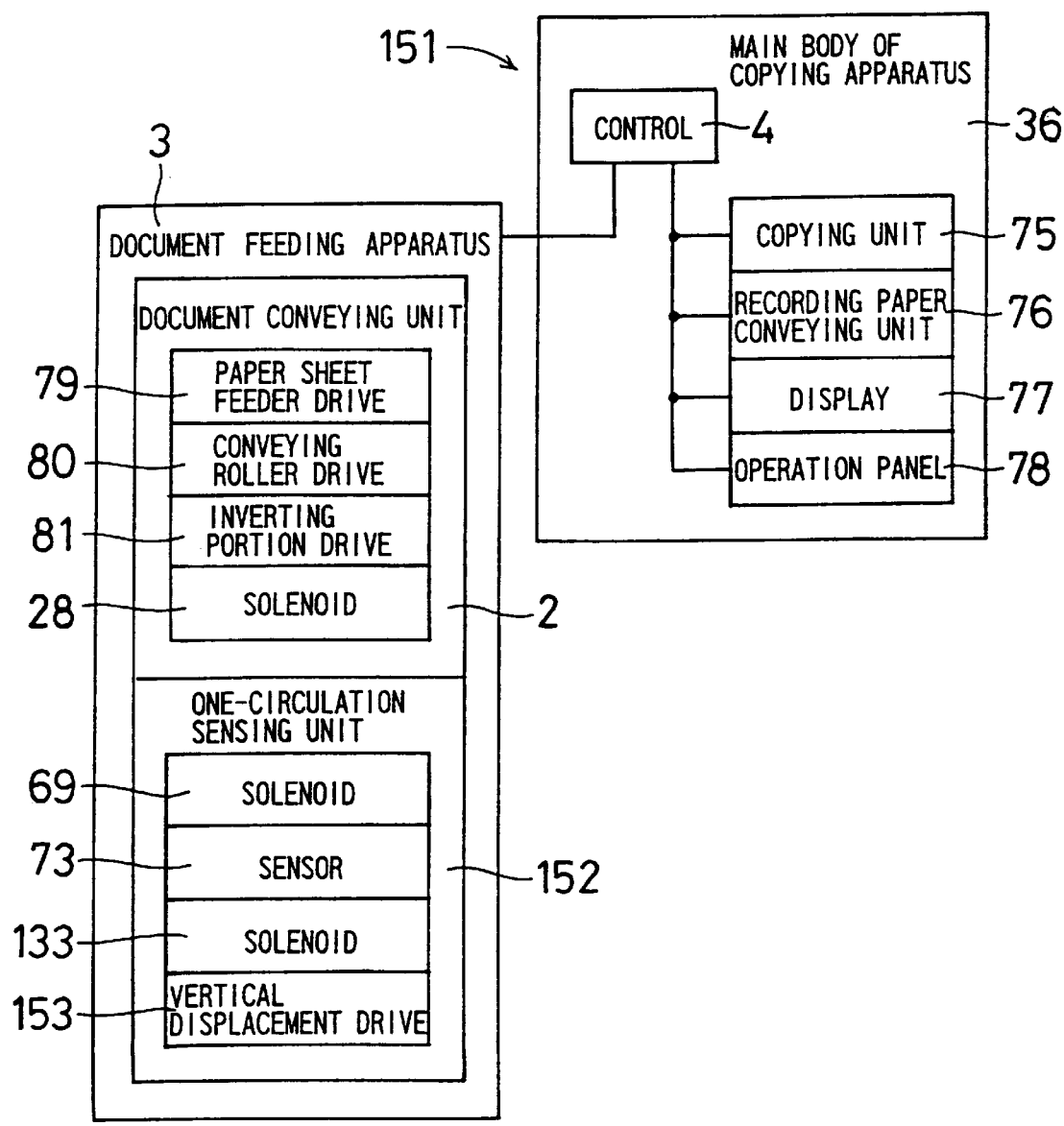
FIG. 14 is a block diagram illustrating the electric construction of a copying apparatus 151 including a one-circulation sensing unit 152 of a fifth embodiment of the present invention.

FIG. 14 is a block diagram illustrating the electric construction of a copying apparatus 151 that includes a one-circulation sensing unit 152 according to a fifth embodiment of the present invention. This copying apparatus is constructed in the same way as in the case of the copying apparatus 131 excepting that the one-circulation sensing unit 152 further includes an ascending/descending displacement (vertical displacement) driving portion 153. The same blocks are denoted by the same reference symbols and their explanation is omitted.

Figure 15:
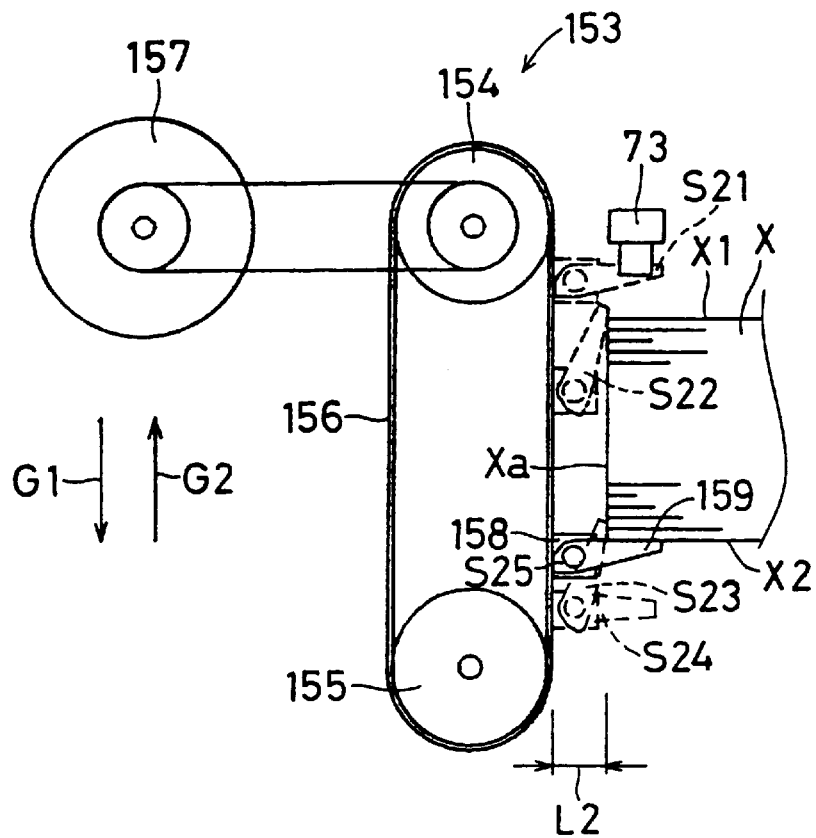
FIG. 15 is a side view illustrating the one-circulation sensing unit 152 on an enlarged scale.
Figure 16:
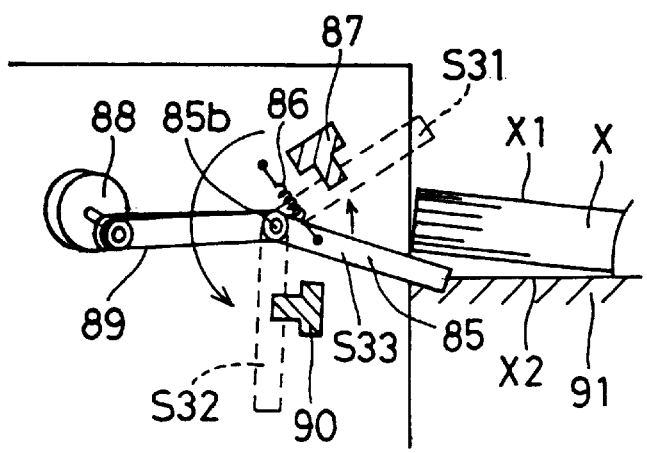
FIG. 16 is a side view illustrating the construction of a one-circulation sensing unit of the prior art.
Figure 17:
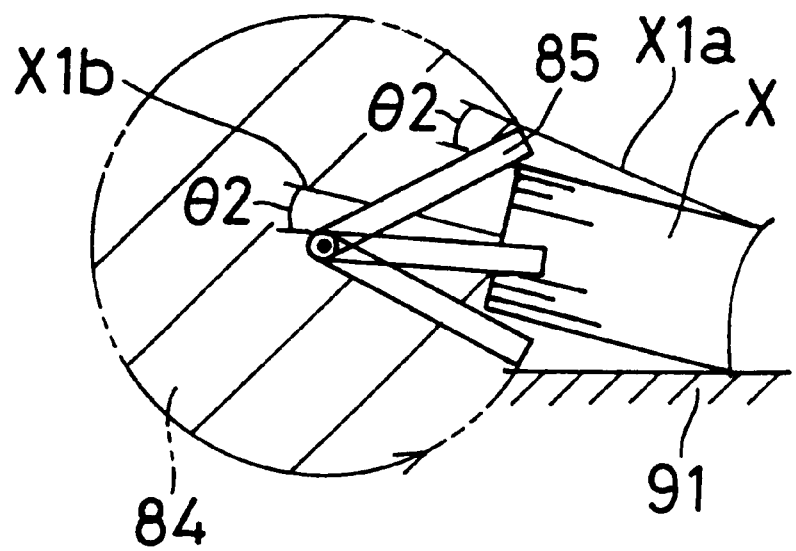
FIG. 17 is a view illustrating a movable range 84 of the sensing member 85 of the one-circulation sensing unit.

FIG. 15 is a side view illustrating the one-circulation sensing unit 152 on an enlarged scale. This unit 152 has the feature of having a mechanism for causing the rise/fall displacement of the sensing member 159. Specifically, the unit includes rollers 154 and 155 that are disposed in the direction of stacking of the documents X and that have a belt 156 wound thereover and a driving roller 157 for rotating the roller 154. The bar-shaped sensing member 159 has its base end portion fixed to the belt 156 by a supporting member 158, whereby the sensing member 159 can be caused to make its rise and fall displacement by driving the belt 156.

Also, the sensing member 159 is fixed in such a manner as to be bendable with respect to the belt 156. Specifically, when the sensing member 159 is displaced from the top face X1 side to the bottom face X2 side, the sensing member 159 is bent substantially in parallel with the belt 156 so that the tip end thereof can pass along the side face of the stack of documents X. When the sensing member 159 is displaced from the bottom face X2 side to the top face X1 side, the sensing member 159 becomes substantially perpendicular to the belt 156 so that the tip end thereof can abut to the face of the document X.

First, the sensing member 159 is disposed at its retracted position (home position) on the top face X1 side of the stack of documents X (S21). Next, when driving the belt 156 and thereby causing the fall of the sensing member 159 in the direction G1, the sensing member 159 held substantially perpendicularly to the belt 156 abuts on the top face X1 of the document. When causing further fall of the sensing member 159, this sensing member 159 is bent in the direction G1 and thereby becomes substantially parallel with the belt 156 (S22). Yet further fall of the sensing member 159 causes the tip end portion thereof abuts on the side face Xa of the document while the sensing member 159 is being bent and moves to the side face Xa of the bottom face of the stack of documents (S23).

When the tip end portion is moved away from the side face Xa of the bottom face of the documents, the sensing member 159 immediately becomes substantially perpendicular to the belt 159 (S24). This mechanism can be realized using the return spring. The sensing member 159 disposed on the bottom face X2 side of the documents is raised in the direction G2 by driving the belt 156 and is thereby caused to abut on the bottom face X2 of the documents (S25). In this state, the conveying operation of the document X is started and the documents X disposed over the sensing member 159 are thereby disposed sequentially under this sensing member 159. Correspondingly to this operation, the sensing member 159 is raised in the direction G2. When the sensing member 159 passes through the top face X1 of the stack of documents, the sensing member 159 is again disposed at its retracted position (S21). At this time, the sensor 73 senses the sensing member 159.

When the sensing member 159 is caused to make its rise/fall displacement in this way, the angle θ2 that is defined between the top face of the documents that are located on the sensing member 159 and this sensing member 159 becomes substantially 0° in the mid-course of the conveying operation. Accordingly, the sensing member 159 reliably abuts on the face of the documents X, whereby it is possible to reliably prevent the sensing member 159 from kicking up the documents X despite the documents X being still existent on the sensing member 159 and thereby erroneously sensing the circulation of the document conveyance. That is, even when conveying a large number of document sheets or conveying the document sheets whose thickness is relatively large, it is possible to reliably sense the circulation thereof.

Also, it is sufficient that the distance L2 that covers from the axis center of the sensing member 159 to the side face Xa of the stack of documents X has at minimum a value that enables the bending of the sensing member 159. Therefore, it is possible to shorten the distance L2 compared to the first embodiment and thereby make the one-circulation sensing unit small in size.

It is to be noted that although in this embodiment the example of constituting the sensing member 159 by the single bar-shaped member is explained, the sensing member 159 may be constituted by plural bar-shaped members as in the case of the above-mentioned embodiment, provided, however, that when having constituted the sensing member 159 by a single bar-shaped member as in the case of this embodiment, the distance L2 becomes the shortest, with the result that the one-circulation sensing unit can be miniaturized.

Also, the retracted position may be set on the bottom face side of the documents. Also, it may be arranged to convey the document X from the bottom face side to the top face side. At this time, the retracted position may be set on any side of the bottom face side and top face side of the documents.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A sheet sensing device for sensing a repeated conveying operation of introducing stacked sheets one by one from a first-face side of the stack of sheets into a prescribed conveying path and returning the introduced sheet from the conveying path to a second-face side of the stack of sheets said second-face side and said first-face side defining face sides of the stack of sheets which are opposite to each other to sense whether or not the sheet conveying operation has made a completed single circulation, the sheet sensing device comprising:

a sensing member having a tip end and means for reciprocatingly moving the sensing member in a direction of stacking of sheets and for bending the sensing member so to pass along a side face of the stack of sheets when being displaced from the first-face side to the second-face side, the sensing member including a plurality of separate distinct bar-shaped members articularly connected and bendable so that the sensing member becomes substantially linear and the tip end can abut on a face of the stack of sheets when the sensing member is displaced from the second-face side to the first-face side of the stack of sheets; and sensing means for locating the sensing member on the second-face side of the stack of sheets at an early stage of operation to detect that the sensing member has passed through the first-face side, and thereby indicating that the conveying operation of the sheets has made a complete single circulation.

2. The sheet sensing device of claim 1, wherein the sensing member has a base end and a length L1 measured from the base end to the tip end of the sensing member when the bar-shaped members are disposed linearly, a distance L2 from the base end of the sensing member to the side face of the stack of sheets and a length L3 of the bar-shaped member on the base end side of the sensing member define a relationship of L1>L2>L3.

3. The sheet sensing device of claim 1, comprising a return spring operatively connected to the sensing member for effecting linear restoration of the bar-shaped members, when the tip end of the sensing member bent toward the second-face side has passed the side face of the stack of sheets.

4. The sheet sensing device of claim 1, wherein the sensing member is swingingly displaceable about the side of the base end.

5. The sheet sensing device of claim 1, wherein the stacked sheets are introduced sequentially from the top face side which is the first-face side into the conveying path and are returned to a bottom face side which is the second-face side, the sheet sensing device comprising:

urging means for urging always the sensing member toward the top face side of the stack of sheets; and driving means for driving the sensing member so as to make the sensing member angularly displaceable toward the bottom face side of the stack of sheets.

6. The sheet sensing device of claim 1, wherein the stacked sheets are introduced sequentially from the bottom face side which is the first-face side into the conveying path and are returned to the top face side which is the second-face side, the sheet sensing device comprising:

driving means for driving the sensing member so as to make the sensing member angularly displaceable toward the top face side of the stack of sheets.

7. The sheet sensing device of claim 5, wherein the respective bar-shaped members are connected so as to be mutually angularly displaceable so that the angle which is formed between an upper face of an uppermost sheet located over the sensing member and the sensing member or the angle which is formed between a lower face of a lowermost sheet located under the sensing member and this sensing member is 10° or less.

8. The sheet sensing device of claim 5, wherein the driving means is a solenoid.

9. The sheet sensing device of claim 5, comprising:

control means for, with the retracted position set on the top face side of the stack of sheets, causing angular displacement to the bottom face side of the stack of sheets, by the driving means, of the sensing member which at the time of starting the conveyance is disposed at a retracted position thereof by the urging force of the urging means and for causing abutment of the sensing member onto the bottom face of the stack of sheets.

10. The sheet sensing device of claim 6, comprising:

control means for, with the retracted position being set on the bottom face side of the stack of sheets, causing angle displacement to the top face side of the stack of sheets, by the driving means, of the sensing member which at the time of starting the conveyance is disposed at a retracted position thereof by the gravitational force and for causing abutment of the sensing member onto the top face of the stack of sheets.

11. The sheet sensing device of claim 2, comprising:

moving means for moving the base end side of the sensing member in the direction of stacking of the sheets.

12. The sheet sensing device of claim 1, further including a stopper for limiting angular displacement of the bar-shaped members to a direction different from the bending direction, to a predetermined angle or less is provided at a connecting portion of the bar-shaped members of the sensing member.

13. The sheet sensing device of claim 1, further including;

moving means for reciprocatingly displacing the sensing member in a direction of stacking the sheets;

wherein the sensing member is fixed to the moving means so that, when being displaced from the one-face side to the counterface side, a tip end of the sensing member passes a side face of the stack of sheets under a condition of being bent to be a parallel to a direction of stacking of sheets, and when being displaced from the counter-face side to the one-face side, the tip end can abut on a face of the stack of sheets under a condition of being substantially vertical to the direction of stacking of sheets.

14. The sheet sensing device of claim 6, wherein the respective bar-shaped members are connected so as to be mutually angularly displaceable so that the angle which is formed between an upper face of an uppermost sheet located over the sensing member and the sensing member or the angle which is formed between a lower face of a lowermost sheet located under the sensing member and this sensing member is 10° or less.

15. The sheet sensing device of claim 6, wherein the driving means is a solenoid.

* * * * *